US008603413B2

(12) United States Patent
Fouillet

(10) Patent No.: US 8,603,413 B2
(45) Date of Patent: Dec. 10, 2013

(54) ELECTRODE ADDRESSING METHOD

(75) Inventor: Yves Fouillet, Voreppe (FR)

(73) Assignee: Commissariat a l'Energie Atomique, Paris (FR)

(*) Notice: Subject to any disclaimer, the term of this patent is extended or adjusted under 35 U.S.C. 154(b) by 1703 days.

(21) Appl. No.: 11/630,999

(22) PCT Filed: Jul. 11, 2005

(86) PCT No.: PCT/FR2005/050570
§ 371 (c)(1),
(2), (4) Date: Dec. 28, 2006

(87) PCT Pub. No.: WO2006/008424
PCT Pub. Date: Jan. 26, 2006

(65) Prior Publication Data

US 2009/0192044 A1 Jul. 30, 2009

(30) Foreign Application Priority Data

Jul. 9, 2004 (FR) ...................................... 04 51494

(51) Int. Cl.
*B01L 3/00* (2006.01)
*C02F 1/469* (2006.01)
*C02F 1/48* (2006.01)

(52) U.S. Cl.
USPC ............ 422/504; 422/509; 422/67; 422/68.1; 204/600; 204/607; 204/608; 204/660; 204/668

(58) Field of Classification Search
USPC ......... 422/503–504, 509, 67, 68.1; 506/6, 39; 204/600, 607–608, 660, 668; 345/107, 345/204
See application file for complete search history.

(56) References Cited

U.S. PATENT DOCUMENTS

| | | | | |
|---|---|---|---|---|
| 5,090,643 | A * | 2/1992 | Spears | 244/171.9 |
| 6,017,696 | A * | 1/2000 | Heller | 435/6.11 |
| 6,911,132 | B2 * | 6/2005 | Pamula et al. | 204/600 |
| 7,052,244 | B2 | 5/2006 | Fouillet et al. | |
| 7,569,129 | B2 * | 8/2009 | Pamula et al. | 204/450 |
| 7,767,147 | B2 * | 8/2010 | Adachi et al. | 422/63 |
| 8,147,668 | B2 * | 4/2012 | Pollack et al. | 204/547 |

(Continued)

FOREIGN PATENT DOCUMENTS

| | | |
|---|---|---|
| FR | 2 841 063 | 12/2003 |
| JP | 10-267801 | 10/1998 |

(Continued)

OTHER PUBLICATIONS

G. C. Fiaccabrino, et al., "Array of individually adressable microelectrodes", Sensors and Actuators B, XP000449927A, vol. B19, Nos. 1/3, Apr. 1994, pp. 675-677.

(Continued)

*Primary Examiner* — Brian R Gordon
(74) *Attorney, Agent, or Firm* — Oblon, Spivak, McClelland, Maier & Neustadt, L.L.P.

(57) ABSTRACT

A device for addressing an electrode array of $2^n$ lines of an electro-fluidic device, each line having N electrodes (n≤N). The device includes, on each line, n selection electrodes, all of the line selection electrodes being connected to 2n line selection conductors, $2^{n-1}$ line selection electrodes of $2^{n-1}$ lines being connected to each line selection conductor, and selection devices for selecting one or more line selection conductors.

15 Claims, 18 Drawing Sheets

(56) References Cited

U.S. PATENT DOCUMENTS

| | | | | |
|---|---|---|---|---|
| 2002/0131899 | A1 * | 9/2002 | Kovacs | 422/82.01 |
| 2004/0058450 | A1 | 3/2004 | Pamula et al. | |
| 2004/0134854 | A1 * | 7/2004 | Higuchi et al. | 210/634 |
| 2010/0311599 | A1 * | 12/2010 | Wheeler et al. | 506/7 |
| 2012/0172260 | A1 * | 7/2012 | Otillar et al. | 506/39 |

FOREIGN PATENT DOCUMENTS

| | | | |
|---|---|---|---|
| JP | 2003-200041 | | 7/2003 |
| JP | 2004-022165 | | 1/2004 |
| WO | WO 02/066992 | A1 | 8/2002 |

OTHER PUBLICATIONS

M. G. Pollack, et al., “Electrowetting-based actuation of droplets for integrated microfluidics”, Lab Chip, vol. 2, 2002, pp. 96-101.

U.S. Appl. No. 11/916,751, filed Dec. 6, 2007, Sauter-Starace, et al.

U.S. Appl. No. 11/917,857, filed Dec. 17, 2007, Sauter-Starace, et al.

Japanese Office Action issued Mar. 29, 2011, in Japanese Patent Application No. 2007-519856 (with English-language Translation).

* cited by examiner

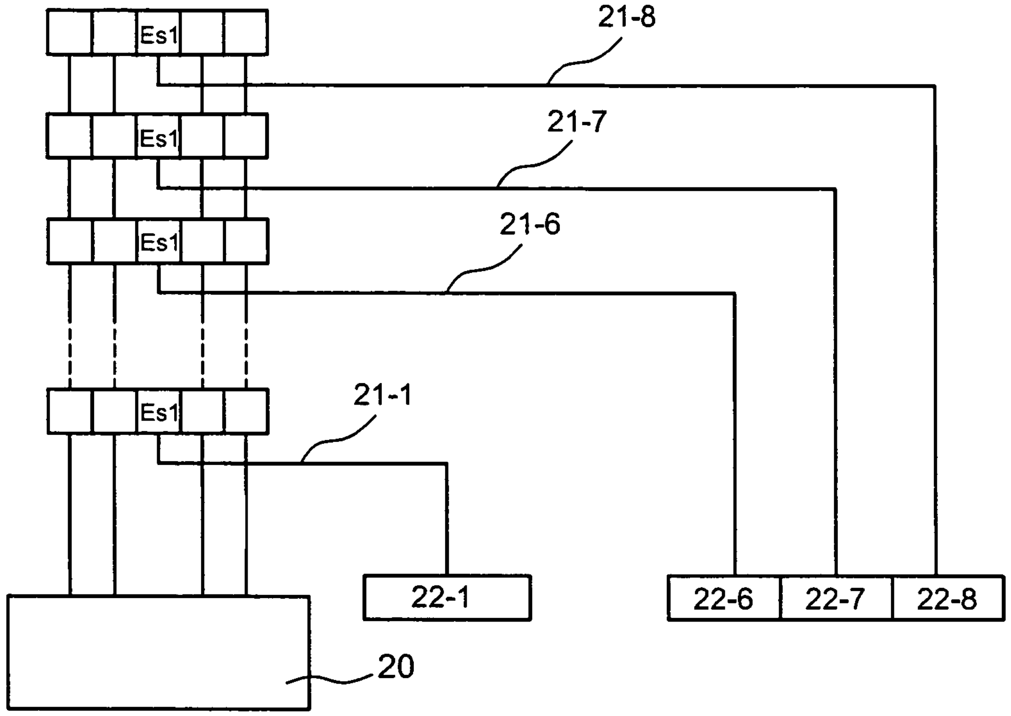
FIG. 2
FIG. 5
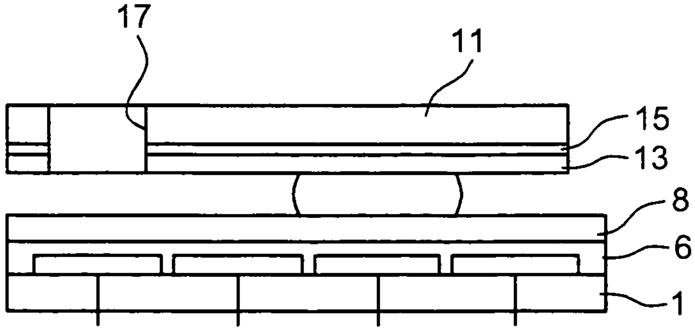
FIG. 9

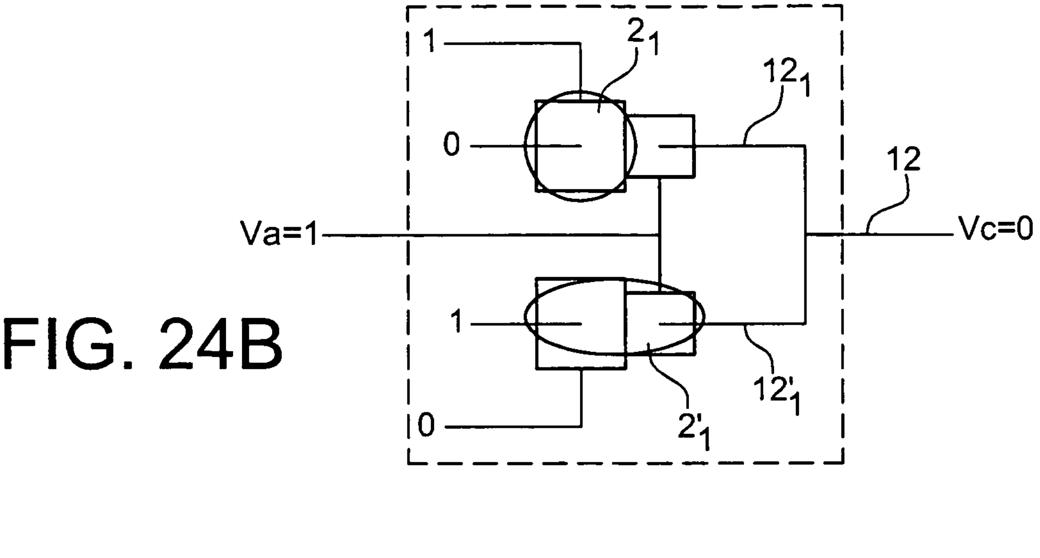
FIG. 24B
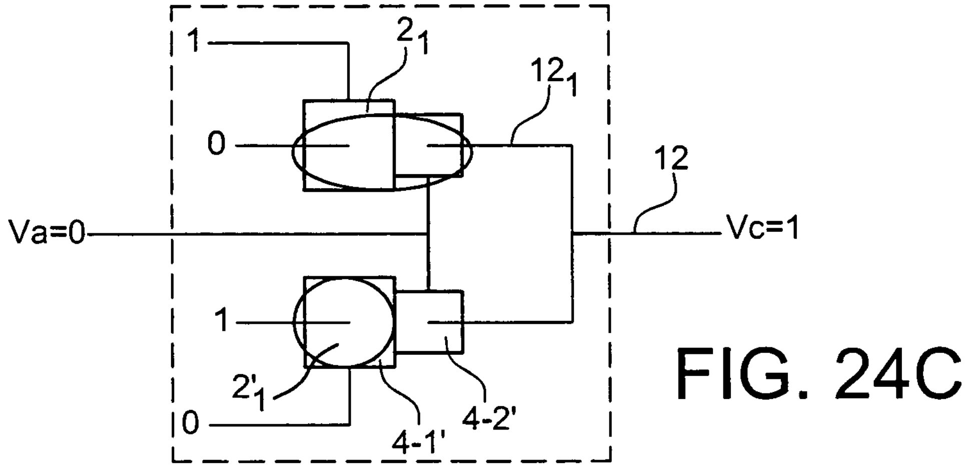
FIG. 24C
FIG. 24D
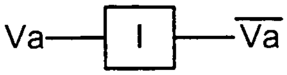

ELECTRODE ADDRESSING METHOD

TECHNICAL FIELD AND PRIOR ART

The invention relates to electro-fluidic multiplexing for the manipulation of a plurality of drops in a microsystem.

The invention is particularly suitable for the lab-on-a-chip requiring the testing of a large number of different liquids, for example, for high-rate analysis or combinatorial chemistry.

The reaction volumes are drops manipulated by electrowetting on electrode series.

One of the most commonly used methods of movements or manipulation is based on the principle of electrowetting on a dielectric, as described in the article by M. G. Pollack, A. D. Shendorov, R. B. Fair, entitled "Electro-wetting-based actuation of droplets for integrated microfluidics", Lab Chip 2 (1) (2002) 96-101.

The forces used for the movement are electrostatic forces.

Document FR 2 841 063 describes a device implementing a catenary opposite electrodes activated for the movement.

The principle of this type of movement is shown in FIGS. 1A to 1C.

A drop 2 rests on an electrode array 4, from which it is isolated by a dielectric layer 6 and a hydrophobic layer 8 (FIG. 1A).

Each electrode is connected to a common electrode via a switch, or rather a system for individual control by electrical relay 11.

Initially, all of the electrodes as well as the counter electrode are placed at a reference potential V0.

When the electrode 4-1 located in the vicinity of the drop 2 is activated (placed at a potential V1 different from V0 by actuation of the relay 11), the dielectric layer 6 and the hydrophobic layer 8 between this activated electrode and the drop, polarised by the counter electrode 10, act as a capacitance, and the effects of the electrostatic charge cause the movement of the drop on the activated electrode. The counter electrode 10 can be a catenary as described in FR 2 841 063 (FIG. 2A), a buried wire, or a planar electrode on a cap in the case of a confined system.

The hydrophobic layer therefore becomes more hydrophilic locally.

The drop can thus be moved closer and closer (FIG. 1C), on the hydrophobic surface 8, by successive activation of the electrodes 4-1, 4-2, and so on, and along the catenary 10.

The documents cited above provide examples of implementations of adjacent electrode series for the manipulation of a drop in a plane.

There are two families of production of this type of device.

In a first case, the drops rest on the surface of a substrate comprising the electrode array, as shown in FIG. 1A and as described in document FR 2 841 063.

A second family of production consists of confining the drop between two substrates, as explained, for example, in the document of M. G. POLLAK et al. already cited above.

In the first case, it is an open system, and in the second case, it is a confined system.

The system generally consists of a chip and a control system.

The chips comprise electrodes, as described above.

The electrical control system comprises a set 11 of relays and an automatic system or a PC making it possible to program the switching of relays.

The chip is electrically connected to the control system, thus each relay makes it possible to control one or more electrodes.

Owing to the relays, all of the electrodes can be placed at a potential V0 or V1.

Generally, the number of electrical connections between the control system and the chip is equal to the number of relays.

To move a drop on an electrode line, it is simply necessary to connect all of the electrodes to relays and to activate them successively as described in FIGS. 1A to 1C.

FIG. 2 shows the case of an array of N lines of electrodes. It is then desirable to simultaneously move (in parallel) N drops on these N lines.

For this, the electrodes are connected in columns, each electrode column being connected to a relay, called a parallel relay 20.

The operation of lines is dissociated in order, for example to bring a single given drop to one end, and to leave the other drops at the start of the line.

To dissociate the lines, at least one column of electrodes, called line selection electrodes, is defined, each of the electrodes of this column being connected, via a conductor 21-*i*, to a relay 22-*i*, which is independent of the relays to which the other electrodes of this same column are connected. These various relays are designated by the references 22-1, 22-6, 22-7, 22-8 in FIG. 2 and are called line selection relays.

All of the drops are moved on the N lines by parallel relays 20, up to the electrode column that precedes the column of line selection electrodes ESL.

By controlling the various line selection relays 22-*i*, it is possible to choose drops that are to be stopped and those that are to continue their movement along a given electrode line.

The drops thus selected can then continue their movement by the controlling of relays 20.

In this implementation, the number of electrical conductors 21-*i* and relays 22-*i* is proportional to the number of lines. For a large number of lines (N=20, 50, 100, etc.), the large number of conductors and relays makes this technology complex and very expensive.

Therefore, we have the problem of finding a method and a device making it possible to simplify the electrical connections while maintaining the possibility of selection for each line of electrodes.

DESCRIPTION OF THE INVENTION

The invention first relates to a device for addressing an electrode array of $2^n$ lines of an electro-fluidic device, each line having N electrodes (n≤N), which device comprises:

- on each line, n so-called selection electrodes, all of these line selection electrodes being connected to 2n line selection conductors, $2^{n-1}$ line selection electrodes of $2^{n-1}$ lines being connected to each line selection conductor,
- selection means, for selecting one or more line selection conductors.

The invention makes it possible to reduce the number of line selection conductors, and therefore to simplify the line selection means in an electro-fluidic addressing array.

Owing to the invention, it is therefore possible to manipulate $2^n$ drops for only 2n input signals.

The invention therefore makes it possible to control line selection electrodes with only 2n relays.

For example, the invention makes it possible to control 8, 16, 32, 64, 128, 256, 512, 1024 line selection electrodes with respectively 6, 8, 10, 12, 14, 16, 18, 20 lines selection conductors and the same number of line selection relays.

The invention is particularly suitable when the number of lines is large (>16 or 32, for example).

The electrodes ESL-k for selecting the different lines can be, for a given value "k", connected to two line selection conductors, the electrodes ESL-k being connected by packets of $2^{k-1}$ alternatively to conductor Ck and to conductor Ck'.

The selection means for selecting one or more line selection conductors can comprise electrical selection relays.

According to one embodiment, in such a device, the means for selecting line selection conductors comprise 2n electrical selection relays, each relay being connected to a single line selection conductor.

According to one embodiment, in such a device, the means for selecting line selection conductors comprise n electrical selection relays, each relay being connected to two line selection conductors.

Each line selection relay can then be combined with means for generating, in addition to an input signal, a complementary signal.

The line selection electrodes are arranged successively along each line, or non-successively along at least one line.

The line selection electrodes of at least one line can be in rectangular form, with the large side of each rectangle being arranged perpendicularly to the line.

The line selection electrodes of at least one line can be in square form according to an alternative.

According to a specific embodiment, at least one electrode line of the array has a cutting electrode (Ec).

Digital line selection means can be provided to control a device according to the invention.

These digital line selection means can be programmed to select the lines of the electrode array according to a binary code.

According to the invention, a combinatory logic is then used, which is obtained by a suitable method of interconnections between a plurality of electrodes at the level of the chip or of the device.

These digital line selection means can comprise means for selecting one or more lines of the array, and means for forming instructions for controlling line selection conductors according to the line(s) selected.

These digital line selection means can also comprise means for consecutively activating the line selection electrodes of a selected line and/or for simultaneously activating the line selection electrodes of a selected line.

The invention also relates to a device for forming liquid drops, comprising a device such as that described above, and means forming containers for liquids, each line of the array being connected to a container.

Such a device according to the invention can also comprise means forming $2^n$ containers for liquids, each line of the array being connected to a single container.

Each line can be connected to a common line of electrodes, in order to mix the liquid drops formed on the different lines.

The invention also relates to a device for addressing an electrode array of p lines, with $2^n<p<2^{n+1}$ lines, of an electro-fluidic device, comprising a device with $2^n$ lines as described above.

The invention also relates to a method for moving at least one liquid volume, using a device as described above, comprising:

the movement of a fluid volume along at least one line of the array by activation of the electrodes of said line.

The line selection electrodes of said line can be activated consecutively or successively.

The invention also relates to a method for forming a liquid drop comprising the movement of a liquid volume as described above, the spreading of this volume on a plurality of electrodes of said line by simultaneous selection of these electrodes, and the cutting of the spread volume by means of a cutting electrode (Ec).

The implementation of the invention makes it possible to control a very large number of drops with simple chip production technology, a minimisation of the number of electrical connections between the chip and the control system, a simplification of the electrical control system, and therefore a minimisation of the costs of chip production, electrical connections and the control system.

BRIEF DESCRIPTION OF THE DRAWINGS

FIG. 2 shows the manipulation of a drop column by relays Rp and the selection of drops by relays Rsl, FIG. 5 is an example of an embodiment of electrodes ESL, FIG. 9 shows a confined device.

DETAILED DESCRIPTION OF SPECIFIC EMBODIMENTS

Figure 3:
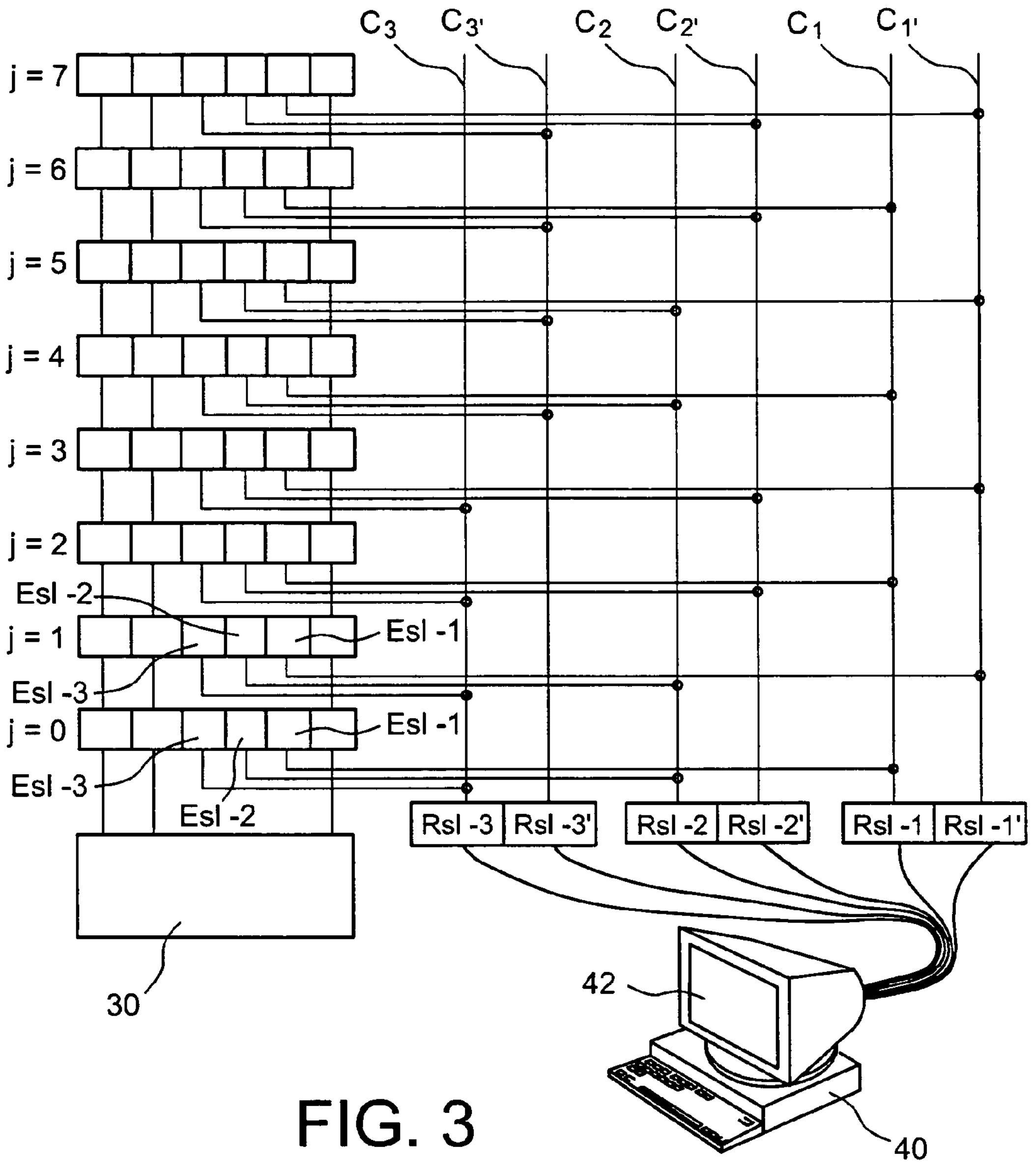
FIG. 3 is an example of electro-fluidic multiplexing with 8 electrode lines.

One embodiment example of the invention will be provided in relation to FIG. 3.

In this example, the device comprises 8 lines (N° 0 to N° 7) of electrodes, i.e. $2^3$ lines.

Each line comprises at least 3 electrodes, with 6 in the example of FIG. 3.

Among the electrodes of each line, 3 so-called selection electrodes Esl1, Esl2, Esl3 are selected. More generally, for $N=2^n$ lines, n selection electrodes Esl-i, i=1−n are selected on each line, n>0.

The line selection electrodes Esl-i are connected to line selection relays, as explained in greater detail below, or to line selection conductors C1, C1', C2, C2', C3, C3' themselves connected to line selection relays.

In FIG. 3, 6 (=2×3) line selection conductors are implemented. These conductors are, in this figure, grouped in pairs.

In general, for N=$2^n$ lines, there are 2n line selection conductors.

The n line selection electrodes of each line, and therefore the $2^n$×n line selection electrodes, are connected to one or the other of the conductors of the n pairs of line selection conductors Ck, Ck' (k=1, . . . n et k'=1, . . . n).

Each line selection conductor is controlled by a line selection relay, Rsl-k, Rsl-k' (k=1-3, k'=1-3). Therefore, there are, in total, in this embodiment, 2n line selection relays.

The other electrodes, which are not line selection electrodes, are connected to parallel relays 30, as already explained above: each electrode column is connected to a parallel relay.

For a given line, the electrodes Esl-i are not necessarily consecutive: there can be, for at least one line, a "normal" electrode (which is not a selection electrode) between two selection electrodes Esl-i. Below, we will provide an example of the use of such a device.

In addition, it is preferable to adopt, by convention, a numbering direction common to all of the lines: for example, it is suitable for, on each line, the selection electrode the farthest to the right on the line to be Esl-1, with Esl-2 being the selection electrode to the left of Esl-1 (even if it is not juxtaposed with respect to it) and, more generally, with Esl-k being the selection electrode to the left of Esl-(k−1), even if it is not juxtaposed with respect to it.

FIG. 3 shows Esl-1, Esl-2 and Esl-3 for each of lines j=0 and 1. However, this provision, as explained above, is not the only one possible.

For i=1, the electrodes Esl-1 of the different lines are connected to C1 and C1' (then to Rsl-1 and to Rsl-1') in an alternating manner: in other words, the electrodes Esl-1 are connected alternatively to C1 and C1' (therefore, there is a change every $2^{(1-1)}$ lines, i.e. at each line).

For i=2, the electrodes Esl-2 of the different lines are connected to C2 and C2' (then to Rsl-2 and to Rsl-2'), again in an alternating manner, but every $2^{(2-1)}$ lines, i.e. every two lines. In other words, groups of $2^1$ electrodes Esl-2 are connected alternatively to C2 then to C2'.

For i=3, the electrodes Esl-3 of the different lines are connected to C3 and to C3' (then to Rsl-3 and to Rsl-3'), again in an alternating manner, but every $2^{(3-1)}=2^2$ lines. In other words, groups of $2^2$ electrodes Esl-3 are connected alternatively to C3 then to C3'.

More generally, for N=$2^n$ lines, $2^{k-1}$ electrodes Esl-k (k=1, . . . N) among all of the $2^n$×n electrodes Esl-k of all of the lines are connected to the line selection conductor Ck (connected to the relay Rsl=k the next $2^{k-1}$ electrodes being connected to the line selection conductor Ck' (connected to the relay Rsl-k'). If there are more electrodes Esl-k after these two assignments, they may be assigned again to Ck (and therefore to Rsl-k) for the next $2^{k-1}$ electrodes, then again to Ck' (therefore to Rsl-k') for the next $2^{k-1}$ electrodes. If there is only one group of less than $2^{k-1}$ electrodes, they will be assigned either to Ck or to Ck', depending on whether the previous electrodes Esl-k are connected to Ck' or to Ck.

For a given value of "k", the electrodes ESL-k of the different lines can be connected to two line selection conductors Ck or Ck' (and to corresponding relays RSL-k or RSL-k'), the electrodes ESL-k being connected by packets of $2^{k-1}$, alternatively to conductor Ck and to conductor Ck'.

For a given line, the line selection electrodes of this line are assigned to different pairs Ck, Ck' and therefore, in the configuration of FIG. 3, to different relay pairs Rsl-k, Rsl-k'. In addition, if, as in FIG. 3, the line selection electrodes are paired up, two line selection electrodes of the same line are not assigned to the same pair Ck (Rsl-k), Ck' (Rsl-k').

Finally, for the general case of $2^n$ lines, $2^{n-1}$ line selection electrodes of $2^{n-1}$ lines are assigned or connected to each line selection conductor Ck.

In the case of FIG. 3, the addressing of electrodes ESL-k by the relays RSL-k and RSL-k' for k=1, 2, 3 is summarised in table I below. The addressing of conductors Ck, Ck', respectively connected to Rsl-k and Rsl-k' is derived therefrom.

TABLE I

| Line j | Relay connected to ESL-3 | Relay connected to ESL-2 | Relay connected to ESL-1 |
|---|---|---|---|
| 0 | RSL-3' | RSL-2' | RSL-1' |
| 1 | RSL-3' | RSL-2' | RSL-1 |
| 2 | RSL-3' | RSL-2 | RSL-1' |
| 3 | RSL-3' | RSL-2 | RSL-1 |
| 4 | RSL-3 | RSL-2' | RSL-1' |
| 5 | RSL-3 | RSL-2' | RSL-1 |
| 6 | RSL-3 | RSL-2 | RSL-1' |
| 7 | RSL-3 | RSL-2 | RSL-1 |

For example, for the line j=0, Esl-3 is activated if Rsl-3' is also activated, and therefore also the conductor C3' (FIG. 3).

Regardless of the number of lines and line selection electrodes, each line selection conductor and each relay can have two different states.

A first state is called state "0". The conductor Ck and the electrodes that this relay controls are then connected to the potential V0 (or to a floating potential): the electrowetting does not act on these electrodes. There is no movement or spreading of drops on these electrodes.

A second state is called state "1". The conductors Ck and the electrodes that this relay controls are then connected to the potential V1: the electrowetting can act on these electrodes to move or spread the drops on these electrodes.

In order for a drop to cross line selection electrodes ESL1, ESL2 . . . , ESLn, of the same line, all of the line selection conductors and all of the relays to which these different electrodes are connected must be in state "1".

If a single one of these line selection conductors or relays is in state "0", there is no possible crossing of the liquid on the electrode lines connected to the line selection conductor and to the relay in state "0".

If all conductors Ci and Ci' and all relays RSLi and RSLi' for i=1 to 2n are in state "0", there is no possible crossing of liquid on any of the lines.

However, if all relays RSLi and RSLi' are in state "1", all of the drops can be moved or spread, on each line, on all electrodes ESL-1 to ESL-n.

This embodiment of the invention makes it possible to work with only 2n line selection conductors, and as many control relays, of the $2^n$×n line selection electrodes of all of the lines, with n line selection electrodes on each line.

On the contrary, the known devices implement, at best, $2^n$ line selection electrodes, but with $2^n$ conductors and as many relays (see FIG. 2). The gain achieved by the invention, in terms of the number of conductors and relays, is therefore significant, in particular if the number of lines is on the order of $2^n$ with n≥4, or 8, or 16 and so on.

Relay control means 40 can also be provided, for example digital programmable means (PC or other) to which the relays are connected and which can control these relays.

These means can be equipped with a screen 42 enabling the user to select a line to which a drop must be capable of being transferred. For example, the array is shown on this screen, and the user selects one or more drop transfer lines, using a cursor or a pen enabling said user to designate the line(s) chosen directly on the screen.

Alternatively, an automatic program can select the lines and send corresponding control signals to the electrodes.

Means for storing means 40 make it possible to store the information enabling a given line to be selected. This information is, for example, that of table I in the case of an array for addressing 8 lines. It is stored or memorised in the form of table I or in another form.

Upon instruction by an operator, for example, upon a selection as described above, or upon an instruction of an automatic program, the digital means select, in the storage means, the data making it possible to open or close the necessary relays Rsl-k, Rsl-k', and therefore to activate the necessary electrodes Ck, Ck'.

In the previous embodiment, the line selection conductors Ck, Ck' are connected to as many line selection relays Rsl-k, Rsl-k'.

It is possible, according to another embodiment, to reduce this number of line selection relays.

Figure 4:
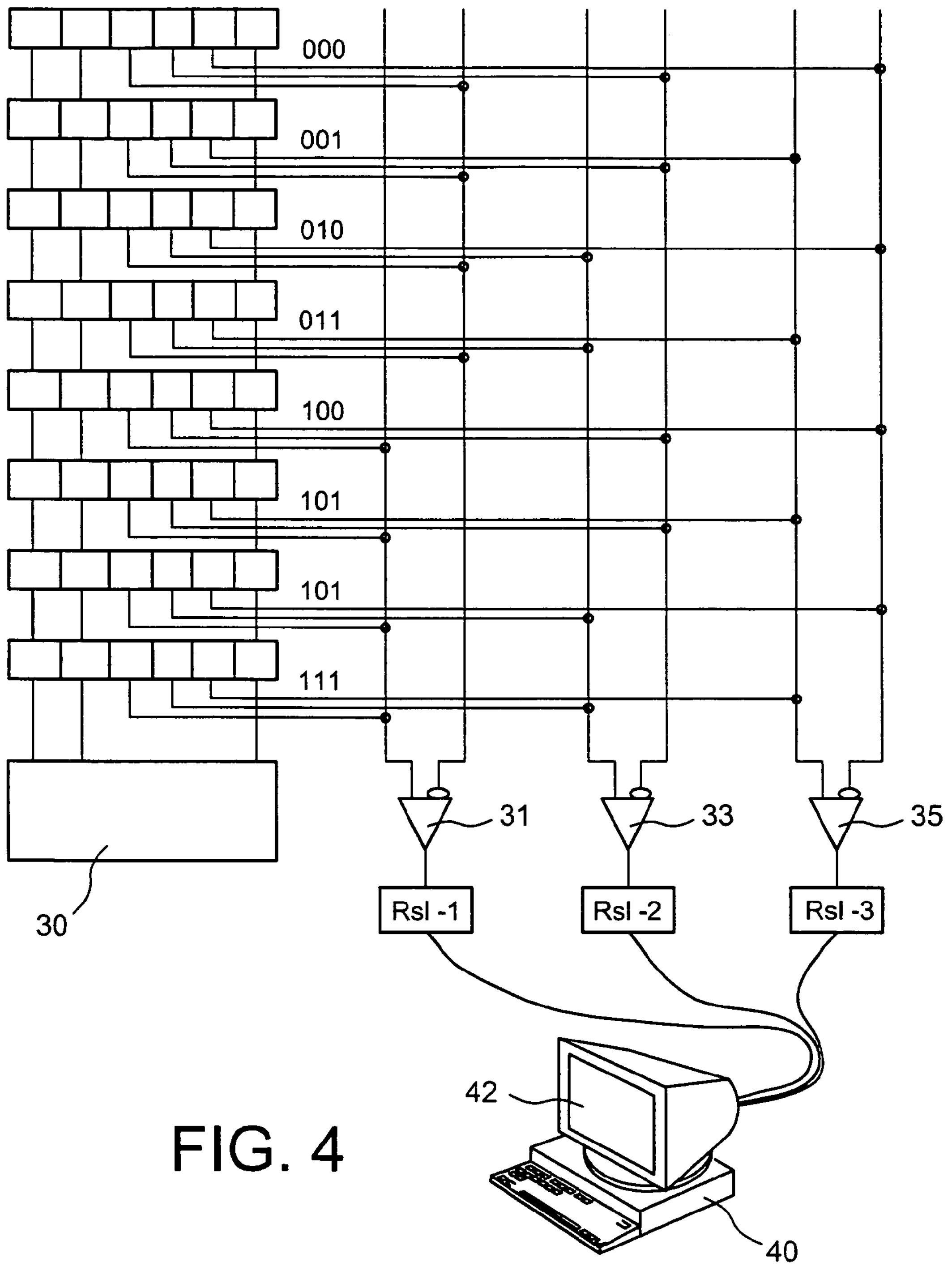
FIG. 4 is an example of an embodiment of the invention, implementing a binary coding with 8 electrode lines.

Thus, according to another aspect of the invention, shown in FIG. 4, the 2n relays can be reduced to a number n if each pair of relays Rsl-k, Rsl-k' is replaced by a single relay and logic gate means making it possible to form, for each relay Rsl-k, an outlet in a first state (state "1") and an outlet in a complementary state (state "0").

Each combination of n inputs of relays Rsl-k, and therefore a corresponding combination of line selection conductors Ck, Ck', leads to the selection or to the opening of one or more lines of the array with a view to transferring a drop to this line.

For example, in the embodiment of FIG. 3, the two relays RSL-i and RSL-i' are replaced by a single relay RSL-i' by using a complementary logic function (FIG. 4). This makes it possible to divide the number of relays by 2.

In this embodiment, there are only n relays.

It is also possible to encode or identify the $2^n$ lines of the array by a binary code with n digits, each line being capable of being selected by assignment, to the input of n relays Rsl-k, of the coding for this line.

It is therefore possible in this case to implement a logic for encoding the lines as a binary number, and to assign this encoding to the line selection relay control, and therefore to the selection of lines themselves. To select a line, its binary code is assigned to the input of the line selection relays.

For example, reference can be made to 4, corresponding to the case of 8 electrode lines, comprising 3 line selection electrodes per line, 6 line selection conductors C1 to C6, but only 3 line selection relays.

In this example, the encoding of lines by using the state of the relays is summarised in table II below:

TABLE II

| Line | Binary number | State of relay RSL3 | State of relay RSL2 | State of relay RSL1 |
|---|---|---|---|---|
| 0 | 000 | 0 | 0 | 0 |
| 1 | 001 | 0 | 0 | 1 |
| 2 | 010 | 0 | 1 | 0 |
| 3 | 011 | 0 | 1 | 1 |
| 4 | 100 | 1 | 0 | 0 |
| 5 | 101 | 1 | 0 | 1 |
| 6 | 110 | 1 | 1 | 0 |
| 7 | 111 | 1 | 1 | 1 |

For a given binary digit, a single line will have the 3 line selection electrodes at potential V1, and a single line will be selected.

For example, the number 101 makes it possible to define the state of the 3 relays enabling the 3 electrodes ESL-1, ESL-2, ESL-3 of line 5 to be at potential V1.

Only the drops placed on this line can circulate.

The other drops cannot cross the electrodes ESL because at least one of them is at potential V0.

The assignments or the connections of the line selection electrodes to the line selection conductors Ck, Ck' are, in this embodiment, the same as in the first embodiment.

Similarly, in this embodiment as well, relay control means 40 can be provided, for example, digital programmable means (PC or the like) to which the n relays are connected and which can control these relays.

These means can be equipped with a screen 42 enabling the user to select a line to which a drop must be capable of being transferred. For example, the array is shown on this screen, and the user selects a drop transfer lines, using a cursor or a pen enabling said user to designate the line(s) chosen directly on the screen.

Alternatively, an automatic program can select the lines and send corresponding control signals to the electrodes.

Storing means of means 40 make it possible to store the information enabling a given line to be selected, for example, the information of table II as provided above, in the form of this table or in an equivalent form.

Upon instruction by an operator, for example, upon a selection as described above, or upon an instruction of an automatic program, the digital means select, in the storage means, the data making it possible to open or close the necessary relays Rsl-k, and therefore to activate the necessary electrodes Ck.

In general, regardless of the embodiment envisaged, two modes of operation can be distinguished.

In a first case, for a given line, a drop is simultaneously spread on all of the line selection electrodes of this line; in a second case, the drop is moved successively over the line selection electrodes of this same line.

With the first mode of operation, the different line selection electrodes of the same line are simultaneously activated. For example, the control means 40 are programmed specifically in order to simultaneously activate these line selection electrodes. Or an operator can choose, on a case-by-case basis, between simultaneous activation and successive activation.

For this, the liquids and the technologies used (confined system or open system) enable the drops to be spread on the entire series of these line selection electrodes.

This is generally the case of confined systems. A confined system comprises, in addition to the substrate as shown in FIG. 1, a second substrate 11, which is opposite the first, as shown in FIG. 9 or as described in the document of MG Pollack cited in the introduction to this application. In FIG. 9, the references 13 and 15 respectively designate a hydrophobic layer and an underlying electrode. The reference 17 designates an orifice formed in the upper substrate 11 (or cap) and makes it possible to serve as a well for introducing a liquid.

For an open system, low surface tension liquids are preferably used (for example water with surfactants).

Depending on the surface tensions of the liquids and the sizes of the electrodes, it may be difficult to obtain a complete spreading of the liquid on all of the n line selection electrodes of the same line, activated simultaneously, when the number n is high (for example: n>3 or 4).

To overcome this problem, it is possible to modify the shape of the electrodes in order to minimise the total length of the different line selection electrodes, and therefore to limit the spreading length of the drop.

This is obtained, for example, by using rectangular line selection electrodes, as shown in FIG. 5. The large side of each rectangle is arranged perpendicularly to the direction of the line.

With the second mode of operation, the line selection electrodes are controlled consecutively.

Indeed, for some configurations, (for example, in an open system with high surface tension drops), it may be difficult to spread a drop simultaneously on all of the line selection electrodes of the same line.

By consecutively controlling the line selection electrodes of the same line (ESL-1 then ESL-2, up to ESP-n, or the reverse if the electrodes are numbered in the opposite direction), the drop selected is moved closer and closer along a line, on the different line selection electrodes placed consecutively at potential V1.

If one of the line selection electrodes is placed at potential V0, the drop is stopped.

To select a new drop, a resetting to zero is performed, which consists of replacing, at the start of the line, all of the drops stopped on one of the line selection electrodes. For example, the electrodes preceding the one on which the drop is located are reactivated, in order to cause the drop to move up along the line.

Alternatives for the formation of a drop will be described below.

It is possible to form drops from a container R by means of an electrode line that is connected to said container and that is itself part of an electrode array.

Figure 6A:
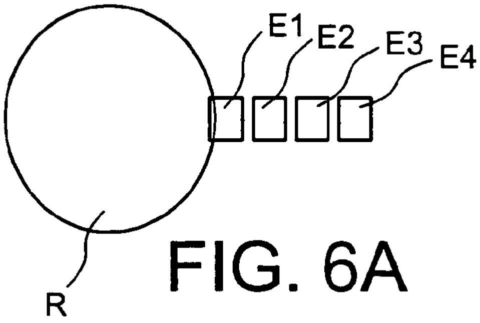
FIGS. 6A to 6D show steps for producing a drop on an electrode line.
Figure 6B:
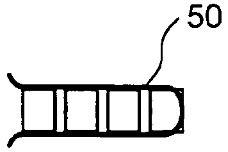

To this end, a series of electrodes E1 to E4 of a line of an array are activated, said line being connected to a container R as shown in FIG. 6A, which leads to the spreading of a drop, and therefore to a liquid segment 50 as shown in FIG. 6B.

Figure 6C:
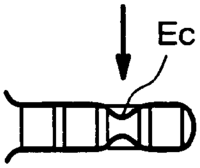
Figure 6D:
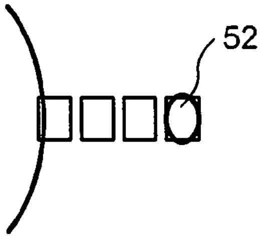

Then, the liquid segment obtained is cut by deactivating one of the activated electrodes (electrode Ec in FIG. 6C). Thus, a drop 52, as shown in FIG. 6D, is obtained.

It is possible to apply the method according to the invention by inserting selection electrodes between the container R and one or more electrode(s) Ec (FIG. 6C) referred to as a cutting electrode.

According to the invention, the selection electrodes make it possible to select the lines where the drops must be formed, to spread the liquid up to the cutting electrodes in order to from a drop.

An example of an application will now be described in relation to FIGS. 7A to 7D.

It relates to a fluid processor for combinatory chemistry.

In this example, the chip comprises $2\times2^n$ containers Rk, $k=1, \ldots, 2^{n+1}$, and a corresponding number of electrode lines.

Each container is associated with an electrode line making it possible to produce a drop. The lines together therefore form an array as already described above.

n line selection electrodes, as described above, are located on each line.

Figure 7A:
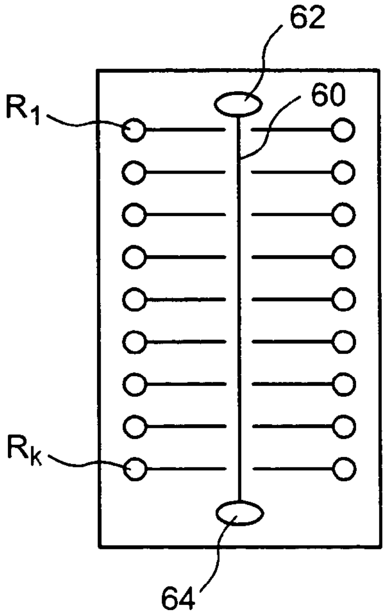
FIGS. 7A to 7D show examples of fluid processors using the invention.
Figure 7B:
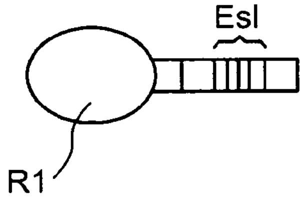

FIG. 7B shows the first line, with its line selection electrodes Esl and the container R1. The other lines have a similar structure.

All of the electrode lines starting at the containers culminate in a common electrode line 60, which can also comprise line selection electrodes. The different reagents are brought to this line 60, in the form of drops, so as to be mixed.

The structure of 7A is symmetrical with respect to said line 60, and therefore comprises $2\times2^n$ lines. However, a structure according to the invention can also be asymmetrical and comprise only $2^n$ lines, all located on the same side, or at 90° with respect to the common line 60.

Figure 1A:
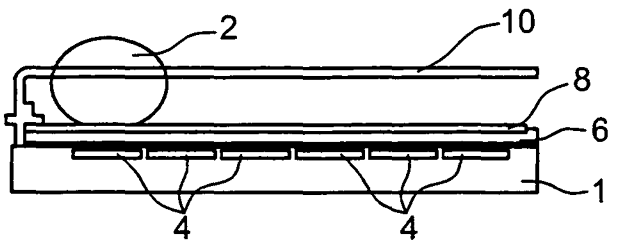
FIGS. 1A to 1C show the principle of drop manipulation by electrowetting on insulation.

The line selection conductors, arranged according to one of the embodiments of the invention, are not shown in FIGS. 7A and 7B, but are underneath a hydrophobic insulating layer, as shown in FIG. 1A.

These line selection conductors are connected to control means such as means 40 and 42 of FIG. 4.

Figure 7C:
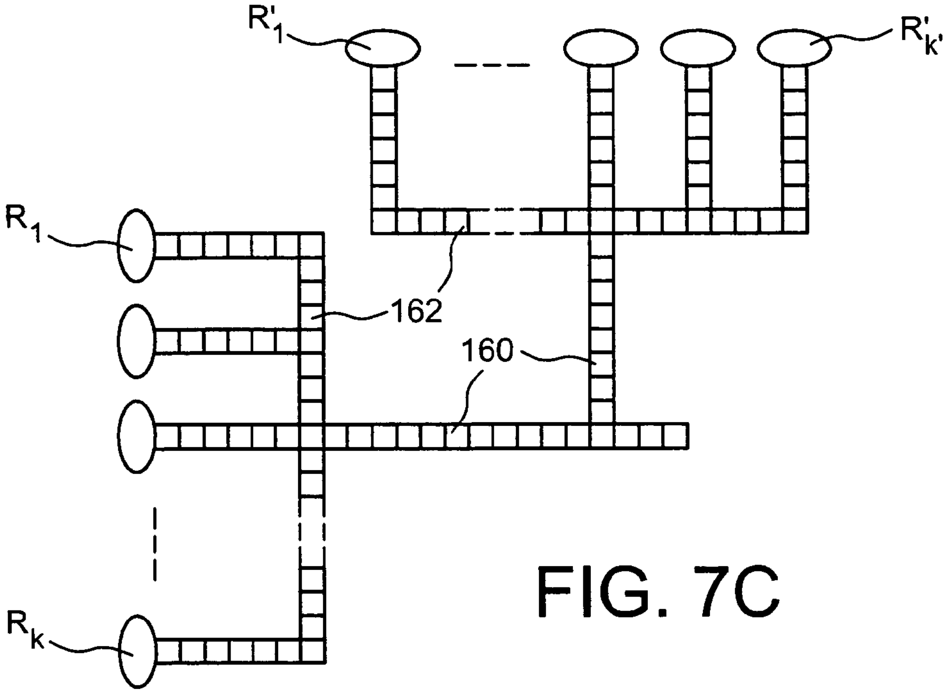

According to an alternative, it is possible to have lines, each equipped with line selection electrodes and connected to a container R1, . . . Rk, R'1, . . . R'k, in a perpendicular architecture, according to an arrangement as shown in FIG. 7C. The lines are perpendicular to common lines 160, 162.

Figure 7D:
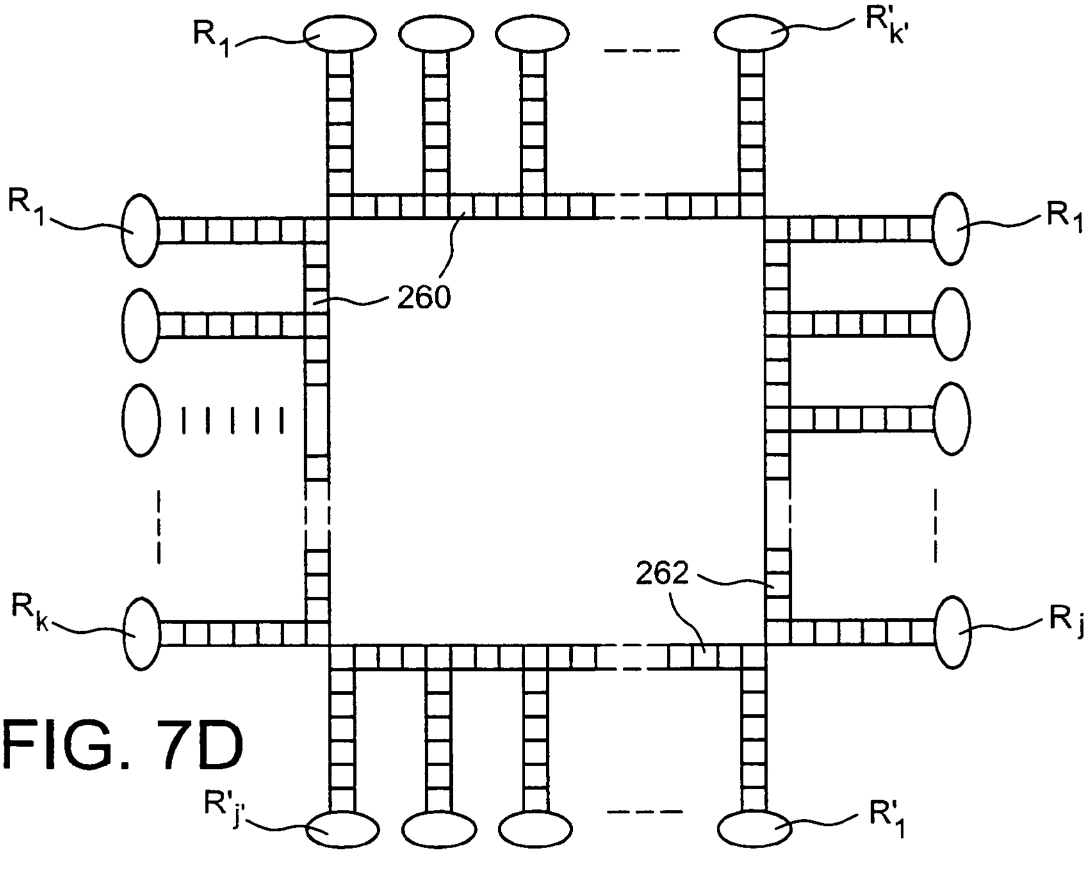

According to yet another alternative, it is possible to have lines, each equipped with line selection electrodes and connected to a container R1, . . . Rk, R'1, . . . R'k', R1, . . . Rj, R'1, . . . R'j' in a square architecture, according t-o an arrangement as shown in FIG. 7D. The lines are perpendicular to common lines 260, 262, which form a square.

Other provisions can be envisaged and make it possible to produce any type of fluid processor or circuit.

The line selection conductors, arranged according to one of the embodiments of the invention, are not shown in FIGS. 7C and 7D, but are underneath a hydrophobic insulating layer, as shown in FIG. 1A.

These line selection conductors are connected to control means such as means 40 and 42 of FIG. 4.

Owing to the invention, it is possible to program a large number of possible combinations of mixtures between the various reagents.

To carry out the analysis of the results, the chip can comprise a detection zone (not shown in the figure) in which a detection can be performed, for example by colorimetry, fluorescence or electrochemistry.

The chip can optionally comprise other inlets/outlets or containers 62 for injecting a sample that is to be mixed, successively, with a combination of different reagents, each coming from a container connected to an electrode line, or to an area 64, called a waste receptacle area, for removing liquids after analysis.

The invention applies not only to arrays comprising $2^n$ lines (n>0 or 1), but also to any array of p lines (p integer), with $2^n<p<2^{n+1}$, n integer. In this case, an array of $2^{n+1}$ lines is processed according to one of the embodiments described above, then the excess lines in this pattern are suppressed.

Figure 8:
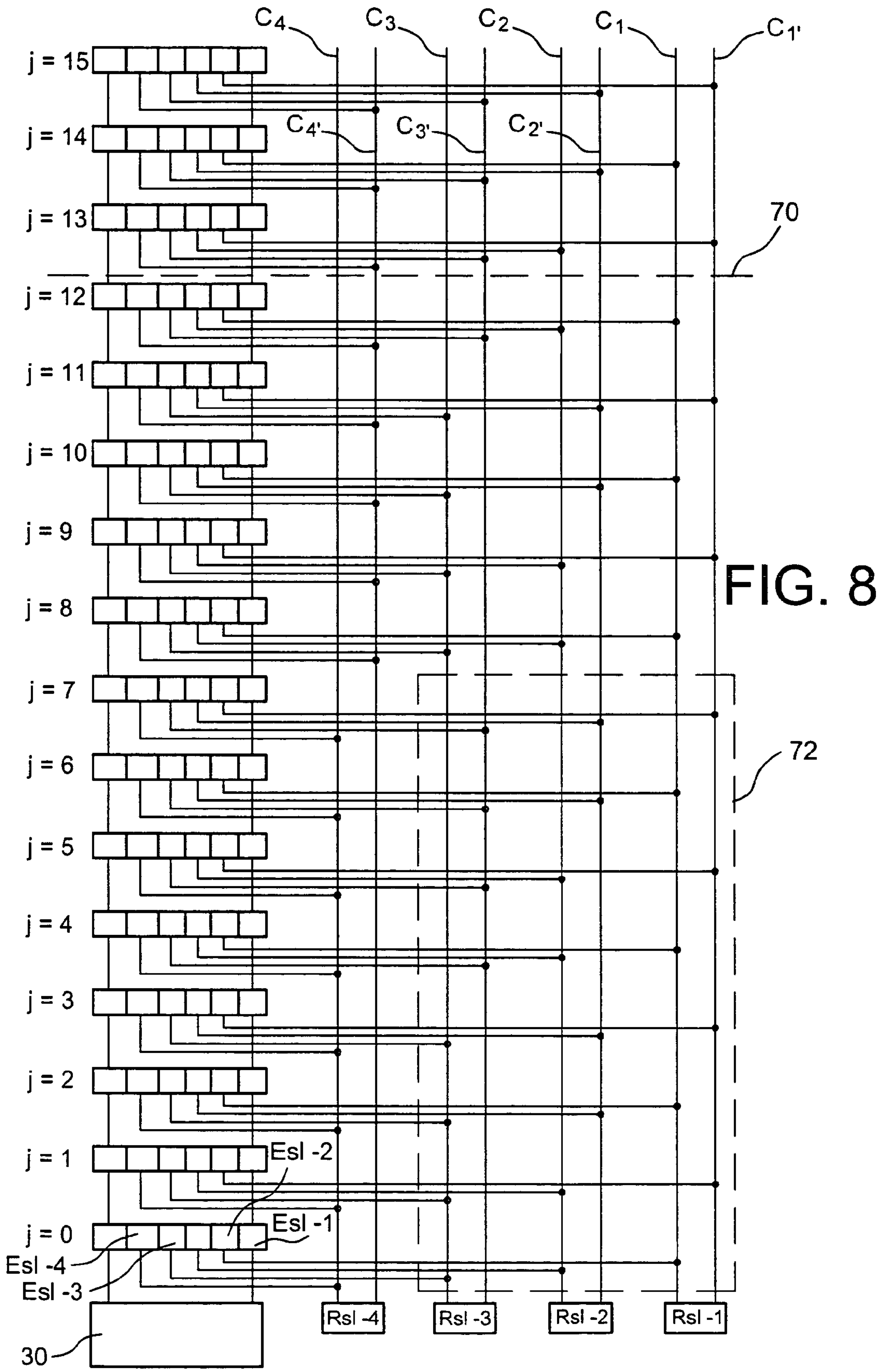
FIG. 8 shows a device with 16 lines, connected according to the invention.

FIG. 8 gives an example of a 16-line array (j=0, . . . 15), with connections to 8 line selection conductors according to the invention.

The switches or relays are diagrammed by 4 blocks Rsl-i (i=1-4), which can take on one of the forms described above in association with one of the embodiments of the invention.

The suppression of, for example, 3 lines is symbolised by the dashed line 70. The lines j=13, 14, being eliminated, there is a configuration comprising 15 lines, including the 8 lines j=0-7, each of these 8 lines comprising at least 3 (in fact 4) line selection electrodes Esl-1, 2, 3, connected to the conductors C1, C1', C2, C2', C3, C3' according to the invention (the block 72 of FIG. 8 groups these connections).

The device also comprises two additional line selection conductors C4 and C4', which, for lines 0 to 7, are respectively completely occupied or empty, and are not therefore involved in the identification of lines.

A device comprising p lines, with $2^n<p<2^{n+1}$ therefore comprises a device with $2^n$ lines according to the invention. Each of these lines no longer comprises n line selection electrodes, but n+1, of which n are connected as already described above in relation to FIGS. 3 and 4.

The invention therefore makes it possible to obtain a method and a system for addressing an electro-fluidic array having any number of lines.

Figure 1B:
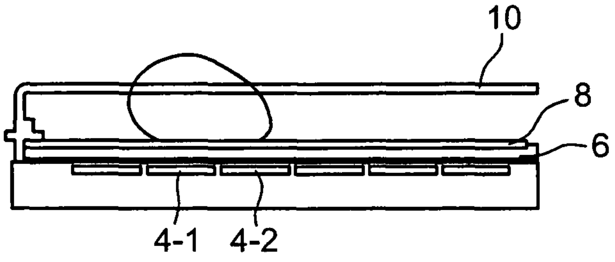
Figure 1C:
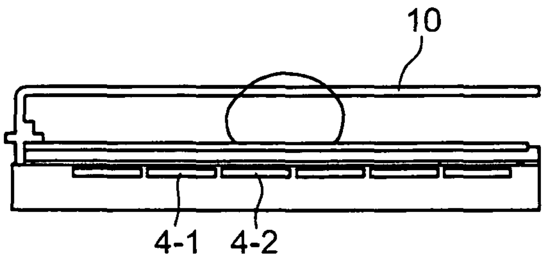

A device according to the invention can be provided in a structure such as that shown in FIGS. 1A to 1C, the electrodes, arranged in an array, being located under an insulating layer 6 and a hydrophobic layer 8.

The substrate 1 is, for example, made of silicon, glass or plastic.

Typically, the distance between the conductor 10 (FIGS. 1A to 1C) and the hydrophobic surface 8 is, for example, between 1 μm and 100 μm or 500 μm.

The conductor 10 is, for example, in the form of a wire with a diameter of between 10 μm and a few hundred μm, for example 200 μm. This wire can be a gold, aluminium or tungsten wire, or it can be made of other conductive materials.

When two substrates, 1, 11 are used, in the case of a confined structure (FIG. 9), they are separated by a distance between, for example 10 μm and 100 μm or 500 μm.

In this case, the second substrate comprises a hydrophobic layer 13 at its surface intended to be in contact with the liquid of a drop. A counter electrode 15 can be buried in the second substrate, or a planar electrode can cover a large portion of the surface of the cap. A catenary can also be used.

Regardless of the embodiment considered, a liquid drop 2 will have a volume of between, for example, 1 nanolitre and several microlitres, for example between 1 nl and 5 μl.

In addition, each of the electrodes of a line of the array will have, for example, a surface on the order of a few dozen μm2 (for example 10 μm2), up to 1 mm2, according to the size of the drops to be transported, the spacing between neighbouring electrodes being, for example, between 1 μm and 10 μm.

The structuring of the electrodes of the array can be obtained by conventional micro-technological methods, for example by photolithography, the electrodes being, for example, produced by depositing a metal layer (AU, or AL, or ITO, or Pt, or Cr, or Cu), then photolithography.

The substrate is then covered with a dielectric layer of Si3N4 or SiO2. Finally, a hydrophobic layer can be deposited, for example Teflon using a spinner.

The same techniques apply to the production of the second substrate of FIG. 9, in the case of a confined device.

Methods for producing chips incorporating a device according to the invention can also be directly derived from the methods described in document FR 2 841 063.

Figure 10:
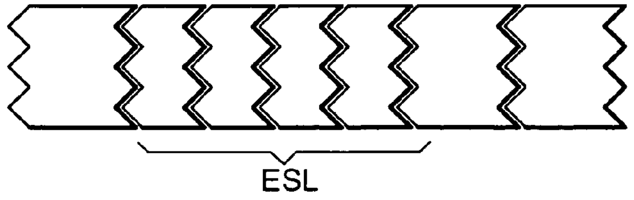
FIG. 10 shows a structure of electrodes of which one of the profiles has a saw-tooth form.

Regardless of the embodiment, the electrodes of at least one line preferably have a saw tooth profile as shown in FIG. 10. The saw teeth of the consecutive electrodes engage with one another. This makes it possible to facilitate the movement of the menisci from one electrode to the other.

Figure 11A:
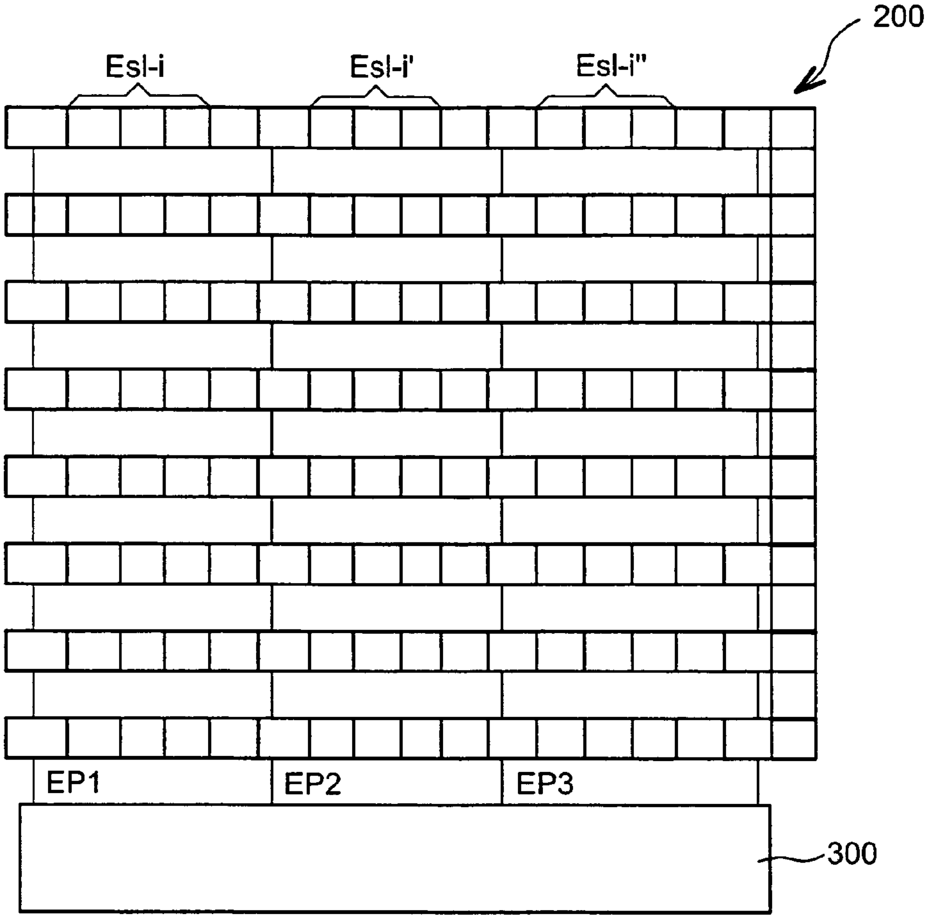
FIGS. 11A and 11B show examples of the series arrangement of electrode arrays according to the invention.

An alternative embodiment of a device according to the invention will be described in relation to FIG. 11A.

This is an electrode array architecture, or a series arrangement of a plurality of multiplexes.

It is indeed possible to arrange a plurality of electrode systems in series as described above in relation to one of FIG. 3, 4 or 8 or one of the alternatives of the invention already described above. A matrix-type structure is obtained. This configuration makes it possible to selectively move drops between two parallel electrode columns EPI, EP2, EP3, . . . EPn. In addition, it is possible to place, in one or more places in the array, one or more column(s) of 200 electrodes making it possible to move a drop from one electrode line to the other.

Line selection electrodes Esl-i (i=1-3), Esl-i' (i'=1-3), Esl-i" (i"=1-3) are arranged on each line of electrodes. The number of 3 line selection electrodes is given by way of example and can be any number.

The other electrodes, which are not line selection electrodes, are connected to parallel relays 300, as already explained above: each electrode column is connected to a parallel relay.

Figure 11B:
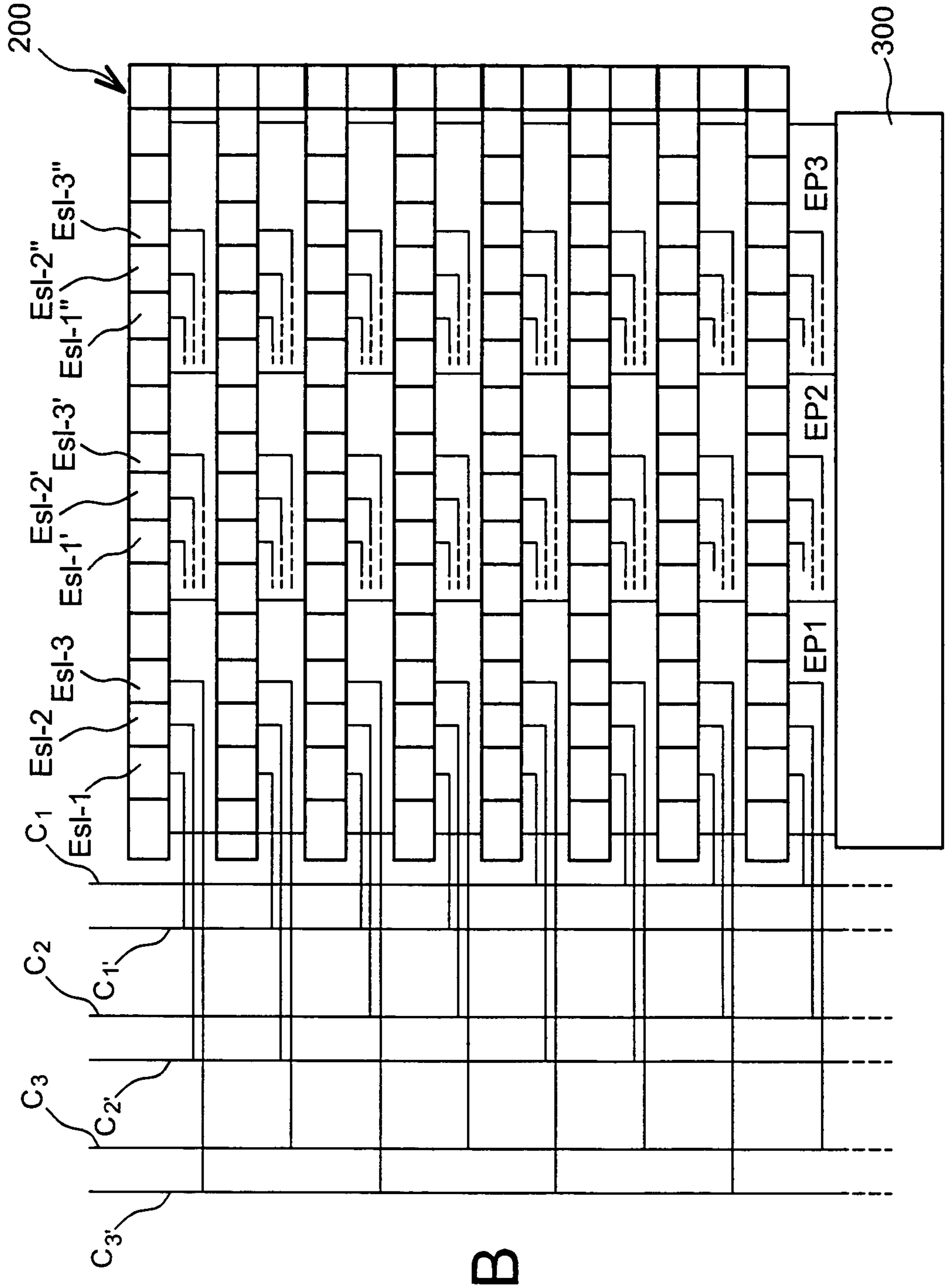

The conductors Ci, Ci' can be arranged as shown in FIG. 11B: there are then as many of these conductors as in FIG. 3 or 4, and as many relays (not shown in FIG. 11B) as in FIG. 3 or 4. Each line selection electrode Esl-1, Esl-2, Esl-3 is connected to these conductors as in FIG. 3 or 4. The same is true of electrodes Esl-1', Esl-2', Esl-3', Esl-1", Esl-2", Esl-3".

In this case, the electrodes Esl-1, Esl-1', and Esl-1" of the same line are activated at the same time. A drop, placed on one of the lines, will move closer and closer, from one electrode system to another arranged in series with it.

According to an alternative, not shown in the figures, each set of electrodes as described above in relation to one of FIG. 3, 4 or 8 or to one of the alternatives of the invention already described above, is associated with a set of 6 conductors $C_k$, $C_{k'}$ (k=1, 2, 3). For the set of the device of FIG. 11A, there are then 3×6 conductors, and as many relay means Rsl-i (i=1-3) to be controlled.

The series arrangement of a plurality of electrode systems, preferably comprising the same number of line selection electrodes, is applied not only to 3 electrode systems, each comprising 8 lines, as described above in relation to the example of FIGS. 11A and 11B, but also to k (k any integer) system of $2^n$ lines of an electro-fluidic device according to the invention, each line having N electrodes (n≤N), said device comprising:

- on each line, n so-called selection electrodes (Esl-i), all of these line selection electrodes being connected to 2n line selection conductors (C1, C1', C2, C2', C3, C3'), $2^{n-1}$ line selection electrodes of $2^{n-1}$ lines being connected to each line selection conductor,
- selection means (Rsl-k, Rsl-k'), for selecting one or more line selection conductors.

This type of series arrangement can also be applied to a device for addressing an electrode array of p lines, with $2^n<p<2^{n+1}$ lines, of an electro-fluidic device, comprising a device with $2^n$ lines according to the invention.

Another example of a chip according to the invention, making it possible to carry out storage and/or mixing and/or dilution operations, will be described in relation to FIG. 12.

It comprises n containers (here n=16 by way of example; it is also possible to have any number n of containers, with n≥2) $R_1$-$R_{16}$ distributed in the following manner in the configuration shown:

- two main containers $R_1$ and $R_{16}$ opening outwardly by wells 317 and 417, for example similar to the well 17 of FIG. 9,
- and 14 secondary containers $R_2$ to $R_{15}$.

The n containers communicate with one another (i.e. liquid volumes can be moved between these containers) by a bus 301 constituted by a line of electrodes. The drops are placed or dispensed on this bus 301 by way of the lines of line selection electrodes Esl-i, Esl-i' in accordance with the invention. The control of these lines is, for example, one of the control modes described above in the context of this invention. The conductors $C_k$, $C_k$, as well as the relays Rsl are not shown in this figure for the sake of clarity. Various modes of operation of a container with one or more electrode lines were also described above in relation to FIGS. 6A to 7D and are applicable to this embodiment.

Figure 12:
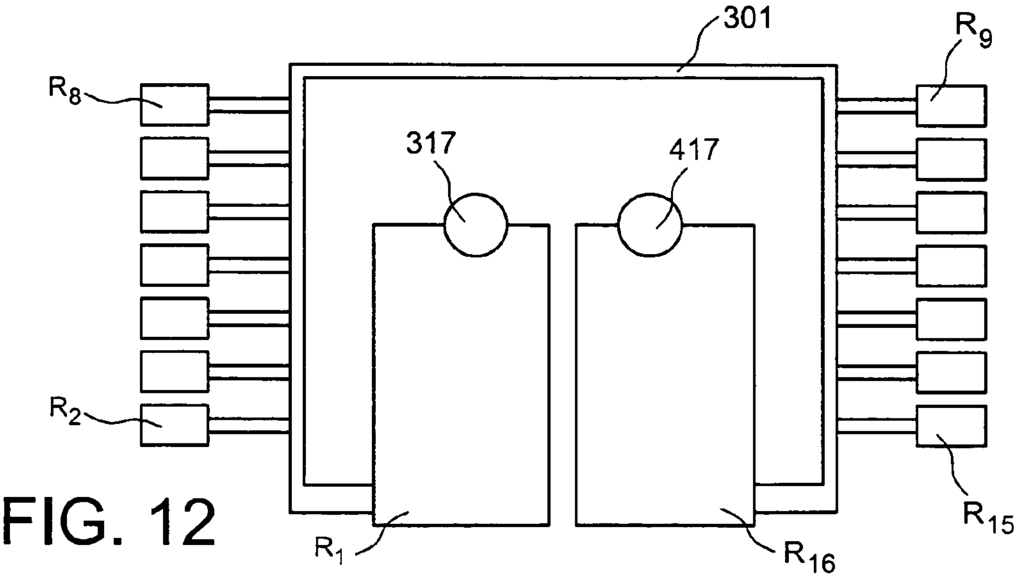
FIG. 12 is an example of a chip for various operations on liquid drops, from different containers, FIGS. 13A to 13 D show various aspects of a fluid processor.

With this device of FIG. 12, a drop of a liquid from container $R_1$ or $R_{16}$ can be selected, as well as at least one drop of one of the secondary containers $R_2$ to $R_{15}$ and these drops can be mixed by transport by electrowetting on the electrode path 301.

Figure 13A:
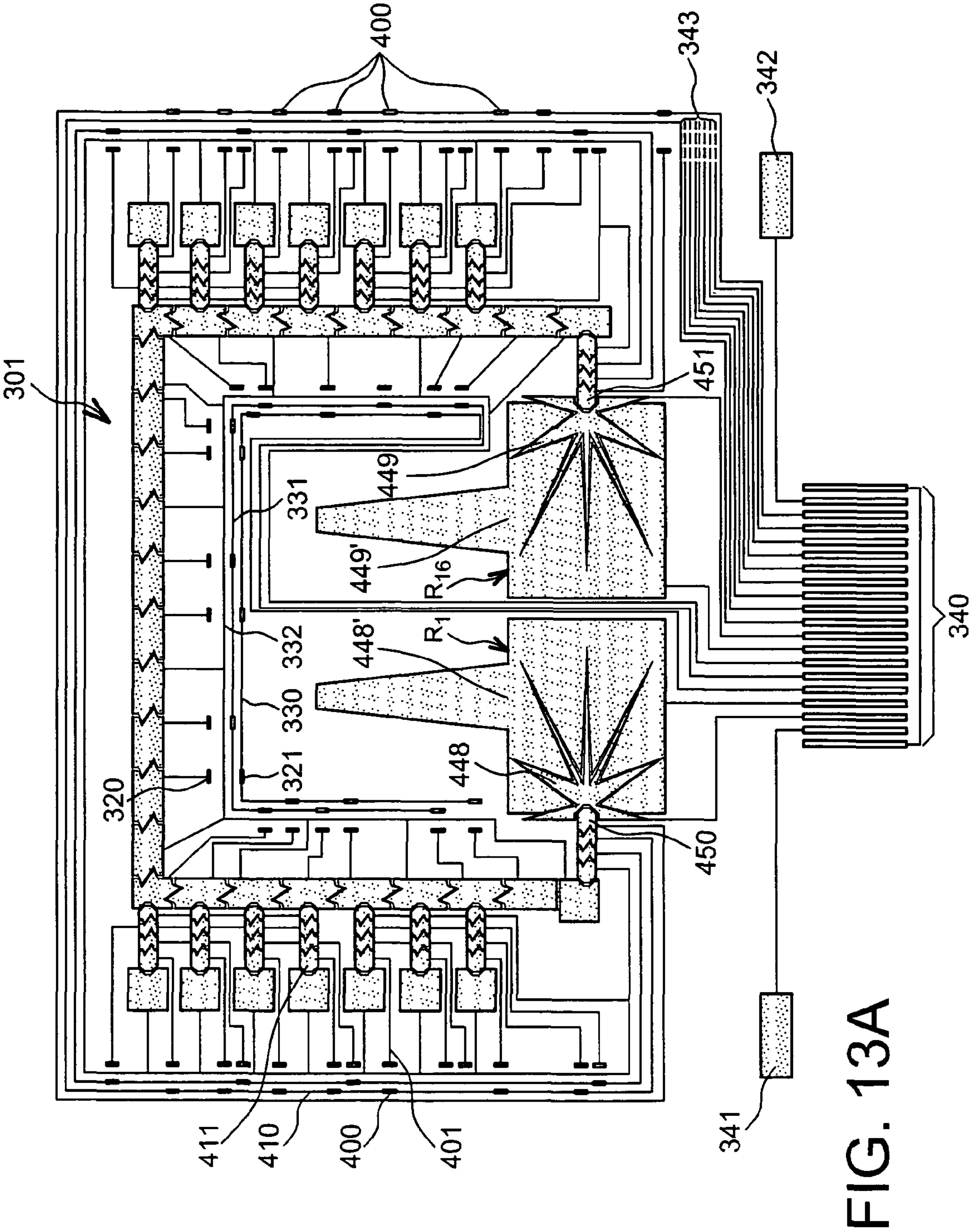

An example of a mask layout used for the photolithography of the electrical level of the electrodes shown in FIG. 13A. This figure clearly shows the structure of the electrodes, in particular of those leading from each container to the bus line 301. The chip in this case comprises 16 containers, which requires 8 electrical connections (as in FIG. 8), not shown in FIG. 13A.

Figure 13B:
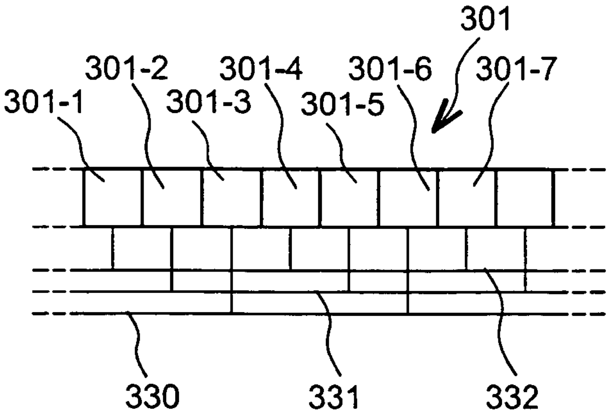

The bus 301 is constituted by a line of activated electrodes 3 to 3. Three relays make it possible to move a drop on the entire bus. The bus and its connection to the conductors 330, 331, 332 controlled by the relays is shown in greater detail in FIG. 13B: the electrodes 301-1, 301-4, 301-7 will be activated simultaneously; then, the electrodes 301-2, 301-5, etc. will be activated simultaneously, and so on.

References 320 and 321 of FIG. 13A show the passages of the line connecting an electrode from the bus 301 to the conductor 320. The line passes under the conductors 331, 332, which means that it passes through the substrate, in 320, then comes out in 321 to come into contact with the conductor 330. The same principle applies to all of the other connections in this figure. A second electrical level (not shown in FIG. 13A) is therefore produced in order to electrically interconnect certain connection lines. Only the connections to the closest conductor (for example, the connection of electrodes from the bus 301 to the conductor 332) do not require this passage underneath the other conductors.

Reference 400 designates another connection, from a line selection electrode 411 to a conductor 410 via a conductor 401.

A comb 340 groups all of the contacts. References 341 and 342 designate electrodes enabling contact at the level of a cover.

Not all of the line selection conductors are shown in this figure, for the sake of clarity.

Furthermore, conductive lines 343 come from the comb 340 in order to produce the connection of line selection conductors (shown or not) but also conductors performing other functions on the chip. In this case again, for the sake of clarity of the figure, the conductors 343 are not shown completely, but in an incomplete manner (they end in the figure in dotted lines).

In total, with a control system working with a limited number of relays, in this case only 16 relays, it is possible to control around one hundred electrodes in order to manipulate the liquids in the 16 containers. The number of relays is in fact dependent not only on the number of containers, but also on other functions to be activated on the chip.

The electrodes are formed by a conductive layer (for ex.: gold) with a thickness of 0.3 μm. The patterns of the electrodes and the connection lines are etched by conventional photolithography techniques. A deposition of an insulating layer is performed, for example with silicon nitride in a thickness of 0.3 μm. This layer is locally etched in order to be capable of taking up the electrical contacts.

For the second electrical level mentioned above, the technology used is the same as that for the electrode level, i.e. a metal deposition and photolithography. The interconnections (some mutual only) are designated by reference 400 in FIG. 13A.

For example, the chip is made of silicon and measures 4 to 5 $cm^2$. The surface of each electrode of the bus 301 and the electrodes of containers $R_2$ to $R_{15}$ is 1.4 $mm^2$. The surface of each selection electrode ESL is 0.24 $mm^2$.

In one or more containers, and in particular in containers R1 and R16, the liquid can be moved by electrowetting toward the outlet of the container, i.e. toward one of the electrodes of the electrode line connected to said container.

In particular, in FIG. 13A, the container R1 (R2, resp.) comprises two electrowetting electrodes 448, 448' (449, 449' resp.).

In FIG. 13A, it can be noted that the shape of electrodes 448 and 449, corresponding respectively to containers $R_1$ to $R_{16}$ is that of a star. This shape of the container electrodes makes it possible to constantly obtain or attract the liquid to the drop formation electrodes, of which the first at the outlets of the containers are respectively electrodes 450 and 451. This makes it possible to initiate the process for forming the finger of liquid as the drop is dispensed, as explained above in relation to FIGS. 6A to 6D.

Figure 13C:
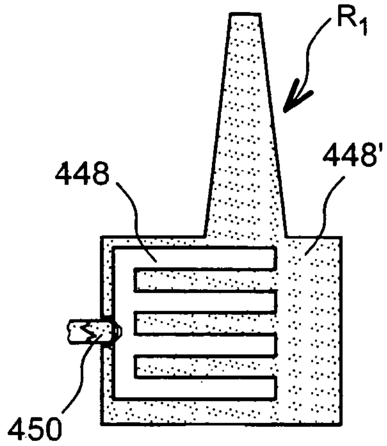

According to an alternative, shown in FIG. 13C, it is possible to use an electrode 448 (and optionally an electrode 449 of the same form) in the form of a comb, which ensures, as in the case of the half-star, an electrode surface gradient. Indeed, the electrowetting on the insulator has the effect of spreading the liquid at the level of the activated electrodes, which in this case results in a liquid position making it possible to maximise the surface opposite the electrode. The result is a "gathering" effect of the liquid near the first drop-forming electrode 450.

This improvement also makes it possible to completely empty the container.

It should be noted that the fingers of the comb (FIG. 3C) or the half-star (FIG. 13A) can be square or pointed.

Figure 13D:
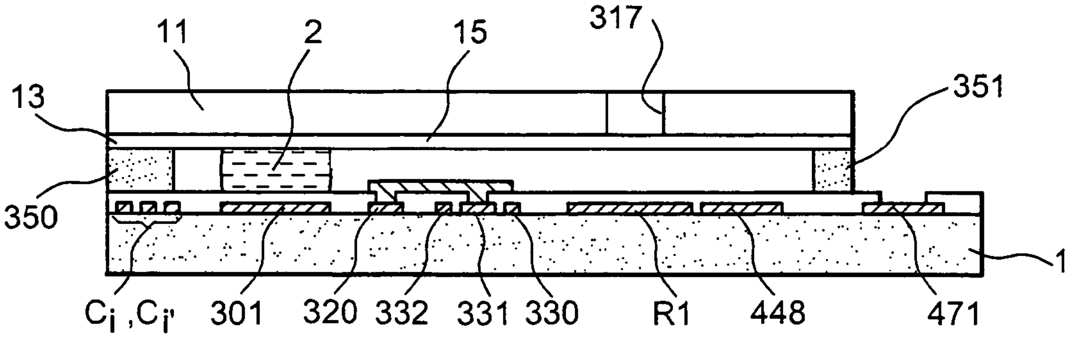

FIG. 13D, which diagrammatically shows the chip in operation, cutting at the level of the container R1, shows the technological apparatus. References 460, 461, 462, 463 designate the electro-wetting electrodes.

Reference 470 designates an interconnection of the electrowetting electrodes between different lines.

Reference 471 designates an electrode of the comb 340 (FIG. 13A).

A thick resin (100 μm of thickness, for example) is rolled, then structured by photolithography, and a hydrophobic treatment is carried out (for example, Teflon AF by Dupont). This resin film is used to define the spacing 350, 351 between the lower plate 1 and the upper plate 11 (FIGS. 9 and 13D). In addition, this resin film makes it possible to confine the containers and avoid the risks of contamination or coalescence between the drops placed in the various containers. The chip is glued, then electrically wired to a printed circuit plate. The chip is coated with a polycarbonate cover (substrate 11) with an ITO (indium-titanium-oxide) electrode 15 and a thin hydrophobic layer 13. The fluidic component thus formed is filled with silicone oil.

An example of the operation of this device, or fluidic protocol, will be provided below.

With the chip described above, it is possible to carry out a protocol making it possible to perform successive dilutions. The liquid containing the solution to be diluted (liquid containing a reagent, and/or biological samples, and/or beads, and/or cells, etc.) is dispensed into the container $R_{16}$. The objective of the protocol is to dilute the reagent (the sample, beads, cells, respectively). For this, the container $R_1$ is filled with the dilution buffer (water, biological buffer, etc.). The chip is controlled by means such as means 40, 42 of FIGS. 3 and 4 (typically a PC programmed to implement a method according to the invention) and a list of instructions, which corresponds to the dilution method to be implemented, is executed. Each instruction corresponds to a basic operation.

There may be for example 4 types of basic instructions:

OUT 1 or OUT 16: Dispenses a drop from a container $R_1$ or $R_{16}$.

BUS (m, n): Movement of a drop on the bus 301; m and n correspond to the number of the starting container and the number of the end container.

STORE (n): Storage of a drop in one of containers $R_2$ to $R_{15}$.

DISP (n): Dispenses a drop from one of containers $R_2$ to $R_{15}$ by the selection electrodes of said container, in accordance with the invention.

Figure 14A:
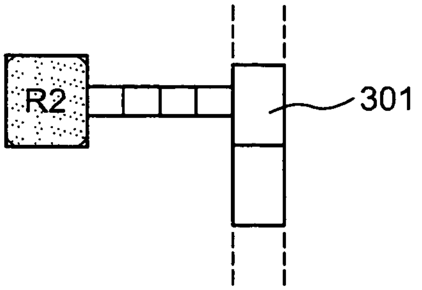
FIGS. 14A to 14D show various steps of a method for mixing drops according to the invention.
Figure 14B:
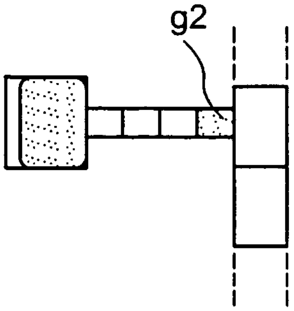
Figure 14C:
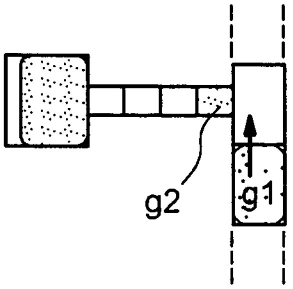
Figure 14D:
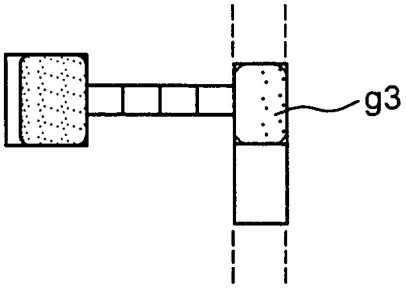

Thus (FIGS. 14A to 14D) to form a liquid drop containing the entity to be diluted, the OUT (16) instruction is executed. To place this drop in the containers $R_2$, the instructions BUS (16, 2) and STORE (2) are carried out successively. Then, a droplet "g2" is dispensed from container R2 (FIG. 14B). The drop g2 is produced on the last line selection electrode (FIG. 14B), on the side of the bus; in addition, a drop "g1" is formed from container R1. This drop g1 is brought by the bus 301 opposite the container R2 (FIG. 14C). g1 and g2 are therefore placed on two adjacent electrodes, which naturally causes the coalescence of the two drops g1 and g2 into a drop g3 (FIG. 14D). Due to the shape of the electrodes, g1 is larger than g2; for example, the volumes of g1 and g2 are respectively 141 nl and 24 nl. Therefore, a dilution ratio of (144+24)/24, i.e. around 7 is obtained.

The new drop g3 thus formed can be stored, for example in container R3. The dilution operation is repeated to form a droplet g4 from R2 and a new drop g5 from R1, with the result being stored in container R4. This operation is repeated until concentrations C1, C1/7, C1/49, Ci/7" are obtained in each container R2 to Rn.

Figure 15:
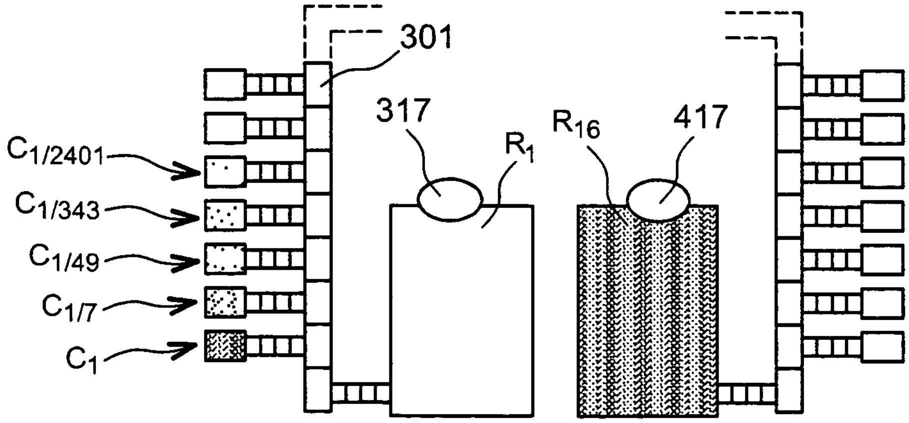
FIG. 15 is an example of a microfluidic chip or processor, with various containers containing fluids with different dilution or concentration levels.

This situation is shown in FIG. 15, which diagrammatically shows the device of FIGS. 12 and 13A, and in which various concentrations in containers $R_2$ to $R_6$ are indicated.

To summarise, the instructions to be provided to the control system 40, 42 of the fluidic component in order to perform 4 successive dilutions with storage of the liquids in the containers R2 to R16 are provided in the following table.

| | |
|---|---|
| OUT16 | Release of a drop from container R16 |
| BUS(16, 2) | Movement toward container R2 |
| STORE(2) | The drop is placed in container R2 |
| DISP(2) | Release of a droplet "g2" from R2 on the last electrode |
| OUT(1) | Release of a drop 'g1' from container R1 |
| BUS(1, 3) | Movement toward container R3 (on the path, drops g1 and g2 coalesce) |
| STORE(3) | The drop is placed in container R3 |
| DISP(3) | Release of a droplet g4 from R3 on the last electrode ES |
| OUT(1) | Release of a new drop g5 from container R1 |
| BUS(1, 4) | Movement to container R4 (on the path, drops g4 and g5 coalesce) |
| STORE(4) | The drop is placed in container R4 |
| DISP(4) | Release of a droplet g6 from R4 on the last electrode ES |
| OUT(1) | Release of a new drop g7 from container R1 |
| BUS(1, 5) | Movement to container R5 (on the path, drops g1 and g4 coalesce) |
| STORE(5) | The drop is placed in container R5 |
| DISP(5) | Release of a droplet g8 from R5 on the last electrode ES |

-continued

| | |
|---|---|
| OUT(1) | Release of a new drop g9 from container R1 |
| BUS(1, 6) | Movement to container R6 (on the path, drops g1 and g9 coalesce) |
| STORE(6) | The drop is placed in container R4 |

The process can be repeated for all of the 14 containers R2 to R15. It is also possible to form a plurality of drops with equivalent concentrations.

For example, it is possible to carry out 4 successive dilutions to obtain a concentration C1/2401, then repeat the dilutions but always from the same container R5. Thus, the other containers R7, R8, R9, and so on will be filled with a liquid volume with the same concentration C1/2401.

After coalescence, the drop can be moved on the bus 301 to homogenise and/or mix the liquids. Typically 12 to 20 movements on the electrodes of the bus are enough for an effective mixture. It is also possible to use the line selection electrodes to have the drops perform two-way movements between the containers and the bus 301 in order to agitate the liquids.

Figure 16:
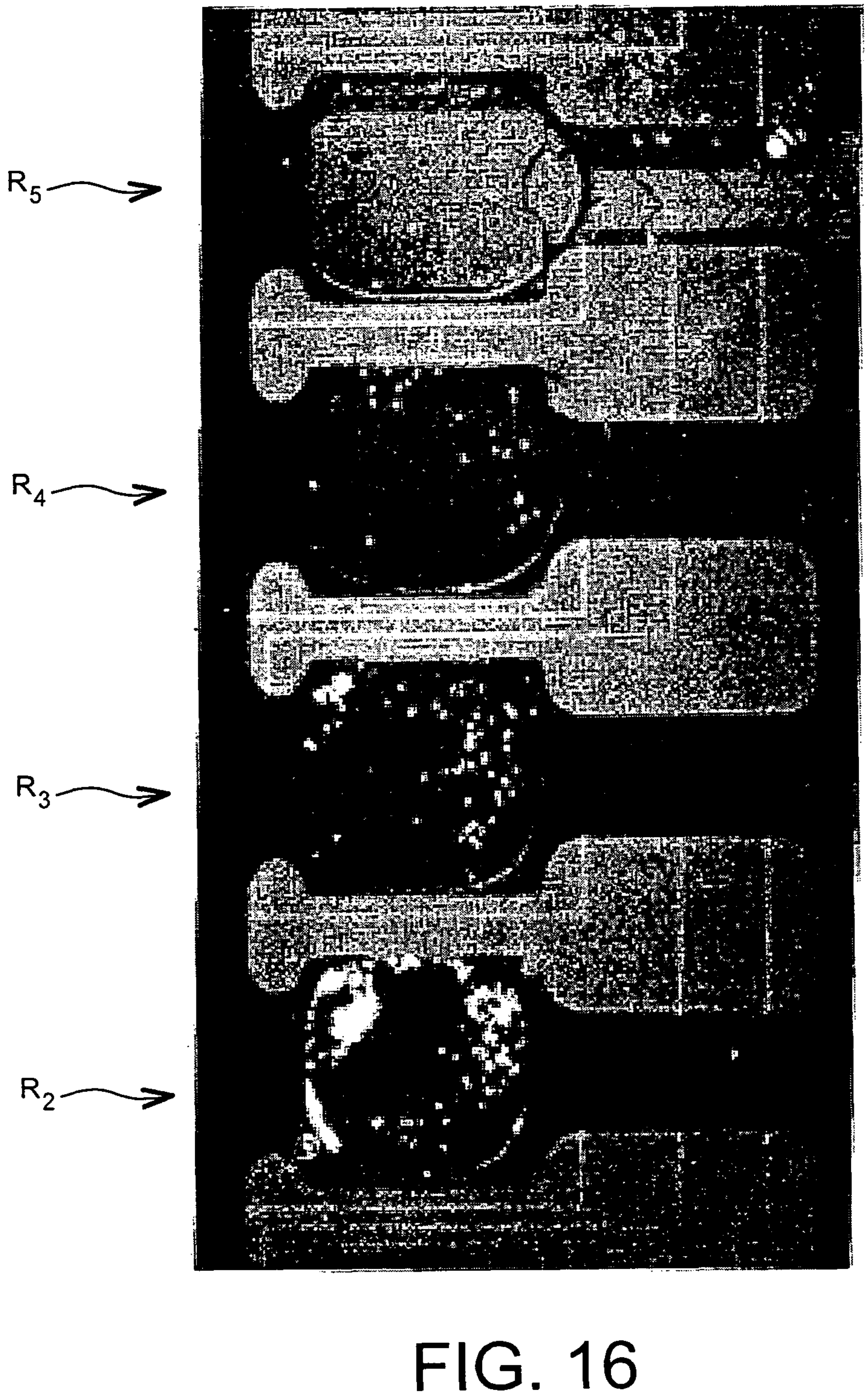
FIG. 16 is a detailed view of four containers containing fluids with different dilution or concentration levels.

FIG. 16 corresponds to a dilution carried out with fluorescent beads (diameter 20 μm in water). With 4 dilutions, there is a change from a high bead concentration (container R2: 400 beads for 140 nl) to several beads (container R3: 80 beads; container R4: 27 beads; container R5: 8 beads; in each case for 140 nl).

The same protocol can be carried out with cells. By implementing the invention, it is possible to manipulate drops containing only a few cells, or even a single cell. It is then possible to apply a biological protocol on this drop in order to study and/or analyse the behaviour of the cell. This protocol can be carried out in parallel on a very large number of drops. One of the applications is drug screening.

Figure 17:
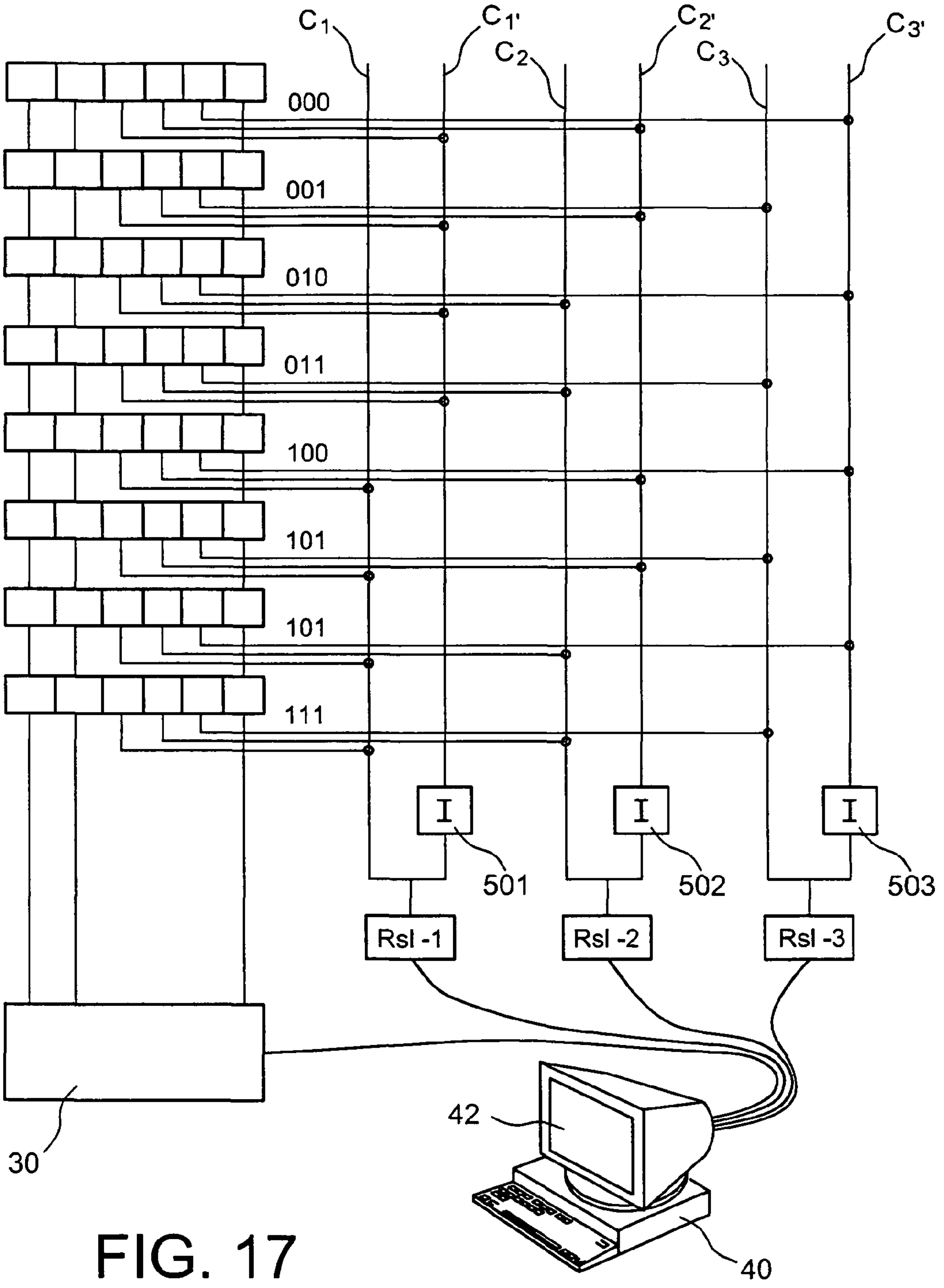
FIG. 17 is another embodiment of the invention, FIGS. 18 to 24D explain how to form a microfluidic contactor capable of being implemented in the context of the invention.

FIG. 17 shows an alternative or an improvement of the device of FIG. 4, in which only one relay device Rsl-k is necessary for two electrode lines Ck, Ck'. The references are identical to those of FIG. 4.

A microfluidic switching device 501, 502, 503 is used in combination with each relay.

Figure 18:
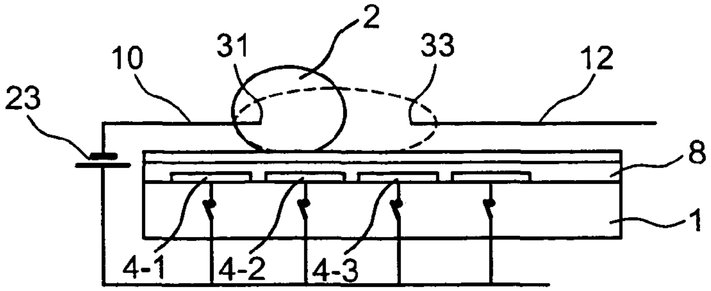

Such a microfluidic switching device operates according to the following principles, which will first be explained in the context of an open configuration. Thus, we will consider the case, shown in FIG. 18, and similar to the case shown in FIGS. 1A to 1C, in which the conductor 10 is interrupted. The end 33 of a second conductor 12, which can be a floating potential, is located at a short distance from the end 11 of the first conductor 10. This distance is such that if, by simultaneous activation of electrodes 4-1, 4-2 and 4-3, the drop 2, after having been brought to the end 11 of the conductor 10, is stretched, it puts, in its position 2' shown with interrupted lines in FIG. 18, the two ends 11 and 33 in contact and brings the conductor 12 to the same potential as conductor 10.

The reverse operation can then be performed, with the drop then returning to its initial position 2 and the conductor 12 is no longer at the potential of conductor 10.

In this operation, the drop 2 is stretched, but not moved. In addition, the contact is achieved by stretching the drop over the planar surface 8. A switching or a change in state therefore results from a stretching of the drop so as to put two lines 10, 12 in contact.

In the initial state, the drop 2 can be formed on a container electrode and be stretched over another neighbouring electrode 4-3.

From the logic perspective, it will be assumed that the potential 0 of the electrodes 4 causes the drop to be spread.

Figure 19A:
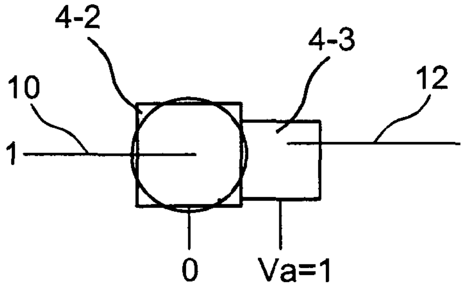
Figure 19B:
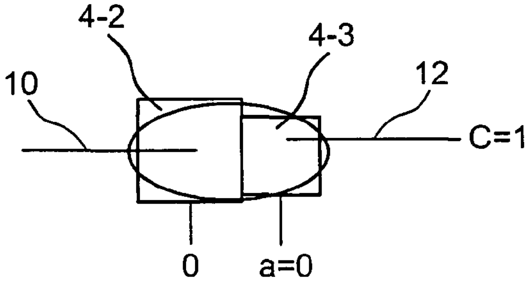

As seen in FIG. 19A, the state of line 12 is modified by the command Va on electrode 4-3. If Va=1, the drop is not spread over this electrode. Line 12 is therefore at a floating potential. If Va=0, then the drop is spread over two electrodes 4-2 and 4-3 and the drop connects line 12, of which the state becomes identical to the catenary 10, which is state “1” (FIG. 19B).

Thus, a microfluidic logic switch is produced.

Figure 19C:
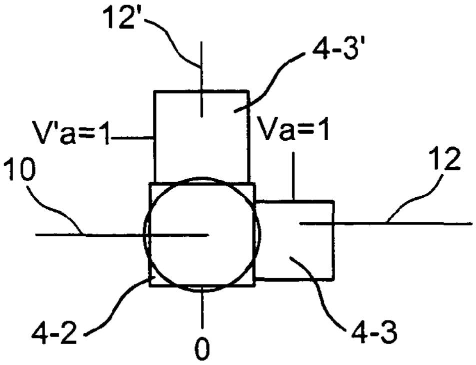

Another embodiment is shown in FIG. 19C: the switch of the drop to a second conductor 12, 12' varies according to the direction of deformation imposed on the drop by the activation of the electrowetting electrodes.

A device according to the invention can also have a closed configuration, of the type shown in FIG. 9.

Figure 20:
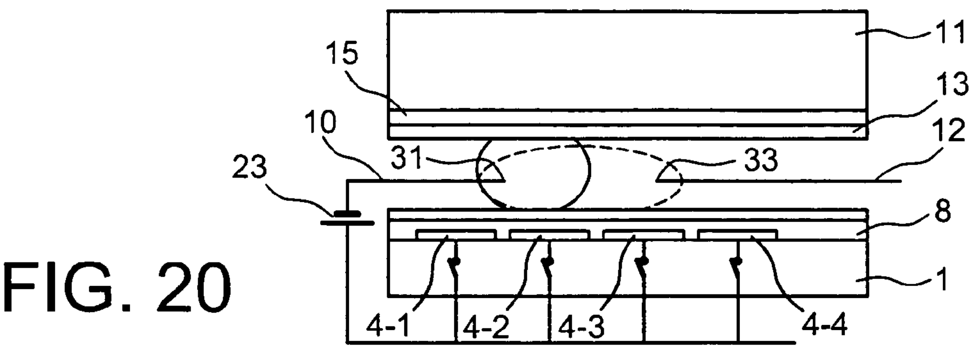

In this case, shown in FIG. 20, the drop 2 will, by stretching or deformation as in the previous case, be switched between a first state and a second state. It is preferable, in this case, to have a low or zero difference in tension between conductors 15 and conductors 10 and 12, in order to avoid any risk of reaction or heating of the drop 2.

In the embodiments already described, the drop is, by stretching or deformation, brought into contact with two conductors located parallel to the substrate 1 or located between the substrate 1 and the cap 11.

Figure 21:
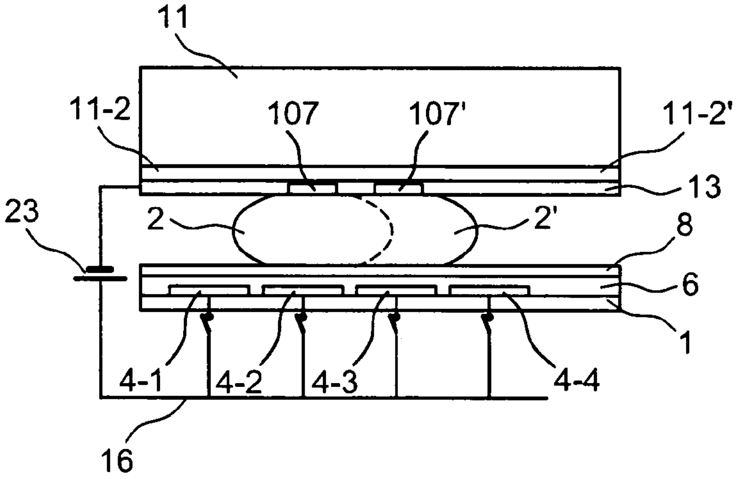

According to another embodiment of the invention (FIG. 21), in a closed configuration, the second substrate or the cap 11 comprises two electrodes or two conductors 11-2, 11-2'. For each of these conductors, the layer 13 of hydrophobic material has an area 107, 107' for which the layer of hydrophobic material is either zero (the corresponding conductor 11-2, 11-2' of the cap is then apparent from the cavity), or low enough to allow a current or charges to pass.

A portion 107 and 107', respectively, of layer 13 of the cap 11 is, for example, etched, so that a drop 2 of conductive liquid makes it possible to produce a contact with the conductor 11-2 and 11-2', respectively (drop in stretched position 2') of the cap. It is also possible to allow a very fine hydrophobic layer, for example on the order of several dozen nm for Teflon, to remain in area 107 and/or area 107'; it is then porous to electrical charges. It is then unnecessary, in this case, to completely etch the hydrophobic layer 13 in this area.

The thickness of the hydrophobic layer allowing a certain porosity for the charges, sufficient for circulation of the current with the counter electrode 11-2 and 11-2', respectively, will depend on the material of the layer 13. In the case of Teflon, there are indications on this subject in the document of S.-K. Cho et al., “Splitting a liquid droplet for electrowetting-based microfluidics”, Proceedings of 2001 ASME International Mechanical Engineering Congress and Exposition, Nov. 11-16, New York. As regards Teflon, a layer of 20 nm, or for example less than 30 nm, is enough to allow charges to pass. For each hydrophobic and/or insulating material, a test can be conducted according to the thickness deposited in order to determine whether the desired potential is reached with regard to the electrode 15.

According to the invention, the switch from one state to another can be controlled by switching from a contact of the drop with an area of the layer 13 where the latter is inexistent or weak, to a contact of the drop with two areas of this layer where the latter is inexistent or weak.

Figure 22:
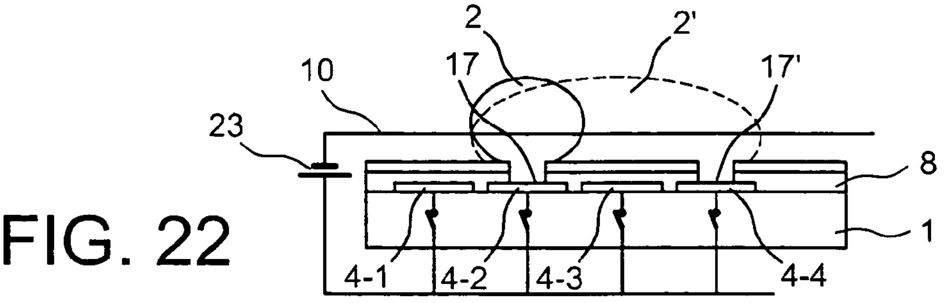

According to yet another embodiment of the invention (FIG. 22), in an open configuration (but that can also be in a closed configuration), two electrodes 4-2 and 4-4 of the substrate 1 are non-passivated and non-coated by the hydrophobic layer 8. The non-passivated areas of the first substrate are designated by references 17 and 17'.

The two electrodes 4-2 and 4-4 are therefore used as contact areas for two states, one in which the drop 2 is only in contact with the electrode 4-2 and the other in which the drop 2 is in contact with the two electrodes 4-2 and 4-4. The switch from one to the other is performed by electrowetting by activation of electrodes located between the depassivated electrodes.

Figure 23:
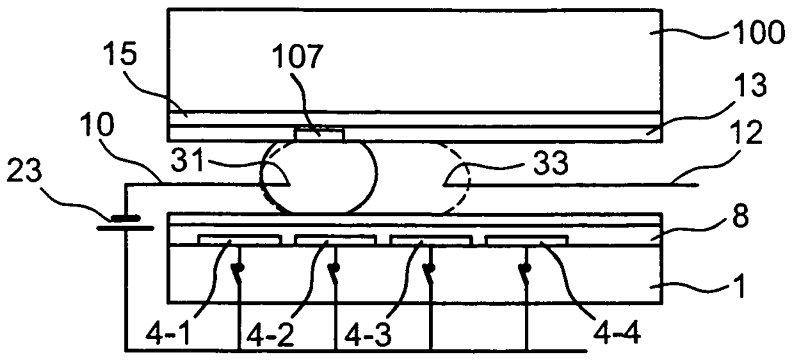

Finally, it is possible to combine the various embodiments above. For example, in FIG. 23, a device according to the invention combines a cap, with an electrode 13 of which an area or potion 107 is without a hydrophobic layer, or has a hydrophobic layer of very low thickness, and two conductors 10, 12 arranged in the cavity between the two substrates, parallel to the surfaces of said two substrates that delimit said cavity.

Thus, the switching can take place between the area 107 and the conductor 12.

Complex functions can be developed from one of the basic configurations disclosed above.

Figure 24A:
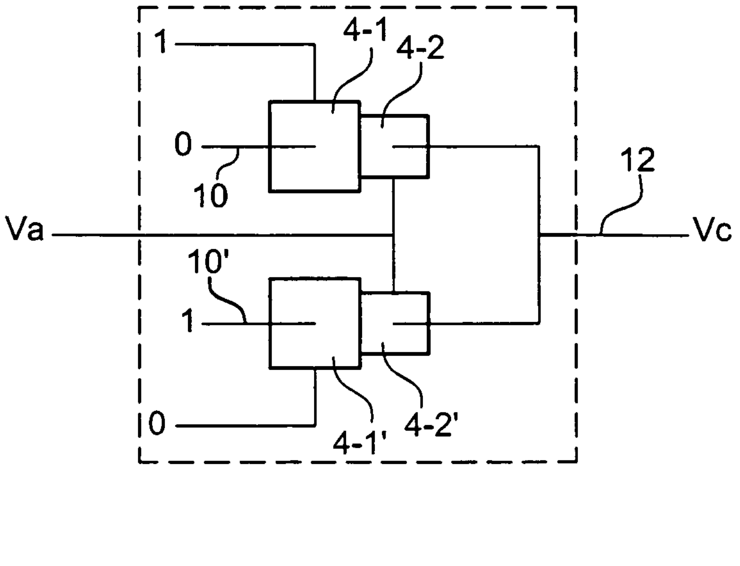

FIG. 24A shows a “complement” function, so that the output 12 is never at a floating potential.

In this figure, at least 4 electrodes 4-1, 4-2, 4-1', 4-2' are concerned. The electrodes 4-1 and 4-1' are respectively in state 1 and 0, while electrodes 4-2 and 4-2' are initially at any potential Va.

Each of the two catenaries 10 and 10' plays the same role, respectively for electrode 4-1 and for electrode 4-1', as already explained above for the catenary 10 with respect to electrode 4-1.

Two states are thus possible.

When Va=1 (FIG. 24B), the drop 21, located on electrode 4-1, remains on this electrode, while the drop $\mathbf{2}_{1'}$ is stretched toward the branch $\mathbf{12}_1$ of the catenary 12. The catenary 12 is then at the potential Vc=0, complementary to Va=1.

When Va=0, (FIG. 24C) the drop $\mathbf{2}_{1'}$, located on electrode 4-1', remains on this electrode, while the drop $\mathbf{2}_1$ is stretched toward the branch $\mathbf{12}_1$ of the catenary 12. The catenary 12 is then at the potential Vc=1, complementary to Va=0.

The complement function explained above in relation to FIGS. 24A to 24C can be symbolised by a single block I, as shown in FIG. 24D, which therefore transforms a voltage $V_a$ into its complement $V_a$.

This device can advantageously be used in a device according to the present invention.

In the diagram of FIG. 17, the use of a block I 501, 502, 503 on each conductor Ck' makes it possible to assign, to this conductor, a state that is complementary to or the reverse of the state assigned to conductor Ck. The relays Rsl-1, Rsl-2, Rsl-3, have the same function as in the case of FIG. 4. But the use of the microfluidic switching component makes it possible to simplify the structure of FIG. 4. The control of the electrodes for activating each microfluidic component can in this case again be performed by means 40, 42.

Each unit 501, 502, 503 is therefore a device making it possible to form a complement function of a voltage, called the input voltage. Such a device comprises two switching devices, each switching device comprising:

- means for moving a liquid drop by electrowetting, comprising a hydrophobic substrate 8 and at least two electrowetting electrodes 4-1, 4-2, 4-3, 4-4,
- a first and at least one second conductor 10, 31, 12, 107, 107', 17, 17', called contact conductors, with which a drop 2 of conductive liquid can come into electrical contact, in a first state in which the drop is in electrical contact with only the first conductor and in a second state in which the drop is in electrical contact with the first and the second conductors,
- means for switching, by electrowetting, a drop between the first state and the second state.

At least one of the two contact conductors of a switching device can comprise a depassivated electrowetting electrode 4-2, 4-4.

A switching device can also comprise a cap 11 with a hydrophobic surface 13 opposite the hydrophobic layer of the substrate, at least one of the two contact conductors comprising an electrode 11-2, 11-2' arranged in the cap, a portion 107, 107' of the hydrophobic surface of said cap either being etched or having a low enough thickness to allow electrical charges to pass.

The means for switching a drop can comprise means for switching a voltage applied to at least one electrowetting electrode, called a switching electrode, between a first value, for which the drop is not in contact with the second conductor and a second value, for which the drop is in contact with the second conductor.

A device for forming a complement function of a voltage (Va), called the input voltage, therefore comprises:

- a first and a second switching device as described above, the two second conductors $\mathbf{12}_1$, $\mathbf{12'}_1$ being connected to a single conductor 12, called the output conductor,
- means for applying the input voltage (Va) on the two switching electrodes 4-2, 4-2' of the two switching devices.

The conductive liquid used for the drops 2', $\mathbf{2}_1$ used in a switching device can be a liquid, a conductive gel, or a material with a low melting point (for example: lead, tin, indium or silver or an alloy of at least two of these materials), which, by the phase change, causes a permanent or temporarily fixed contact (the phase change can indeed be reversible), or a conductive glue (hardening or solidifying by polymerisation, for example). The production of a permanent contact, or the blockage of a switch, can indeed be useful, so as not to provide an electrical supply the contactor or the logic functions while maintaining the spreading of the drop. Thus, the switch or the logic function consumes energy only during the change in state.

The invention claimed is:

1. A biochip for handling liquid droplets comprising:
   - a substrate, comprising an array of $2^n$ lines of electrodes, n being an integer number, each line of electrodes having N electrodes, N being an integer number, wherein $n>1$ and $n \leq N$, each of said lines of electrodes being controllable to displace one droplet of liquid through electrowetting from one of said N electrodes to another one of said N electrodes;
   - a plurality of 2n line conductors;
   - each line of said $2^n$ lines of electrodes comprising a group of n electrodes, each electrode of said group of n electrodes of each of said lines of electrodes being connected to one of said 2n line conductors;
   - each one of said plurality of 2n line conductors being connected to $2^{n-1}$ electrodes in the array of $2^n$ lines of electrodes, each of said $2^{n-1}$ electrodes being in a different one of the $2^n$ lines of electrodes; and
   - a plurality of selector units, each of said line conductors receiving a signal through one of said plurality of selector units.

2. The biochip of claim 1, wherein n is a whole number greater than or equal to three.

3. The biochip of claim 1, wherein the selector units each include a relay.

4. The biochip of claim 1, wherein the selector units include 2n relays, each relay being connected to only one of the line conductors.

5. The biochip of claim 1, wherein the group of n electrodes includes electrodes arranged successively along each of the $2^n$ lines of electrodes.

6. The biochip of claim 1, wherein each of the plural electrodes has a rectangular shape, with a longest side of each rectangle being arranged perpendicularly to a direction of the columns in the array.

7. The biochip of claim 1, wherein another group of electrodes includes one electrode from each of the $2^n$ lines of electrodes, which are in a same column of the array, and individual electrodes of the another group of electrodes are alternately connected to a first line conductor and a second line conductor of the plurality of 2n line conductors.

8. The biochip of claim 3, wherein the relays are each digital.

9. The biochip of claim 3, wherein the relays are configured to select one or more rows of the array according to a binary code.

10. The biochip of claim 1, wherein the relays are configured to consecutively activate electrodes of a selected row of the array.

11. A system comprising: the biochip of claim 1; and
    - plural containers configured to store liquid, wherein each row of the array of the biochip is individually connected to one of the plural containers.

12. A method comprising:
    - obtaining a biochip that includes
      - a substrate, comprising an array of $2^n$ lines of electrodes, n being an integer number, each line of electrodes having N electrodes, N being an integer number, wherein $n>1$ and $n \leq N$, each of said lines of electrodes being controllable to displace one droplet of liquid through electrowetting from one of said N electrodes to another one of said N electrodes,
      - a plurality of 2n line conductors,
      - each line of said $2^n$ lines of electrodes comprising a group of n electrodes,
      - each electrode of said group of n electrodes of each of said lines of electrodes being connected to one of said 2n line conductors,
      - each one of said plurality of 2n line conductors being connected to $2^{n-1}$ electrodes in the array of $2^n$ lines of electrodes, each of said $2^{n--1}$ electrodes being in a different one of the $2^n$ lines of electrodes, and
      - a plurality of selector units, each of said line conductors receiving a signal through one of said plurality of selector units; and
    - moving, with the biochip, the one droplet of liquid along at least one row of the array by controlling an application of a voltage to the electrodes in the at least one row of the array.

13. The method of claim 12, wherein the biochip further includes plural containers each storing a liquid, wherein each row of the array of the biochip is individually connected to one of the plural containers, the method further comprising:
    - forming, with the biochip, a first drop of a first liquid from a first container of the plural containers;
    - forming, with the biochip, a second drop of a second liquid from a second container of the plural containers; and
    - mixing, with the biochip, the first drop and the second drop.

14. The method of claim 13, wherein the first liquid contains at least one of a reagent, biological samples, beads, or cells.

15. The method of claim 13, wherein the second liquid contains water or a biological sample.

* * * * *